(12) United States Patent
Kent

(10) Patent No.: US 6,954,818 B2
(45) Date of Patent: Oct. 11, 2005

(54) PROVIDING A BURST MODE DATA TRANSFER PROXY FOR BRIDGING A BUS

(75) Inventor: David Kent, Windlesham (GB)

(73) Assignee: Renesas Technology Corp., Tokyo (JP)

( * ) Notice: Subject to any disclaimer, the term of this patent is extended or adjusted under 35 U.S.C. 154(b) by 305 days.

(21) Appl. No.: 10/193,117

(22) Filed: Jul. 12, 2002

(65) Prior Publication Data

US 2003/0200373 A1 Oct. 23, 2003

(30) Foreign Application Priority Data

Dec. 7, 2001 (EP) .............................................. 01310244

(51) Int. Cl.[7] .......................... G06F 9/00; G06F 13/28; G06F 13/38
(52) U.S. Cl. .......................... 710/306; 710/35; 710/52; 710/308; 711/105
(58) Field of Search ................................ 710/306, 308, 710/107, 31, 35, 1, 100, 52, 316, 310, 37, 329, 22; 712/36–38; 711/100, 105; 709/212, 218, 238, 253; 370/351, 402

(56) References Cited

U.S. PATENT DOCUMENTS

| | | | | |
|---|---|---|---|---|
| 5,537,602 A | * | 7/1996 | Kametani | ..................... 712/38 |
| 5,771,359 A | | 6/1998 | Galloway | |
| 5,909,552 A | * | 6/1999 | Jensen et al. | ................ 709/234 |
| 5,941,960 A | | 8/1999 | Miller | |
| 6,247,086 B1 | | 6/2001 | Allingham | |
| 6,708,236 B1 | * | 3/2004 | Date et al. | ..................... 710/35 |

OTHER PUBLICATIONS

"Performance of bus allocation policies for an ATM switch under bursty arrivals and correlated destinations" by Zaghloul, A.O.; Perros, H.G.; Viniotis, I. (abstract only) Publication Date: Dec. 12–15, 1993.*
"JAZiO signal switching technology: a low–cost digital I/O for high–speed applications" by Haq, E.; Slager, J.; Pecoraro, J.; Johnson, J.D.; Sanloro, M.; Tavrow, L.; Wakefield, S.; Weisner, D. (abstract only) Publication Date: Jan.–Feb. 2001.*
European Search Report; Application No. EP 01 31 0244.
"Mobile Multi Media Open Computing Platform", Motz, P. et al.; SAE 2001–01–0809.

* cited by examiner

*Primary Examiner*—Gopal C. Ray
(74) *Attorney, Agent, or Firm*—Antonelli, Terry, Stout and Kraus, LLP.

(57) ABSTRACT

A computer system component serves as a burst mode data transfer proxy for bridging a bus operable in burst transfer mode and a single transfer mode bus. FIFOs, associated with respective DMA channels, provide a shared area for assembling and disassembling bursts on behalf of subsystems on the single transfer mode bus. The component also performs DMA functions.

33 Claims, 21 Drawing Sheets

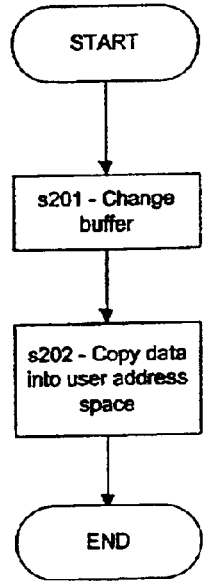
Figure 27
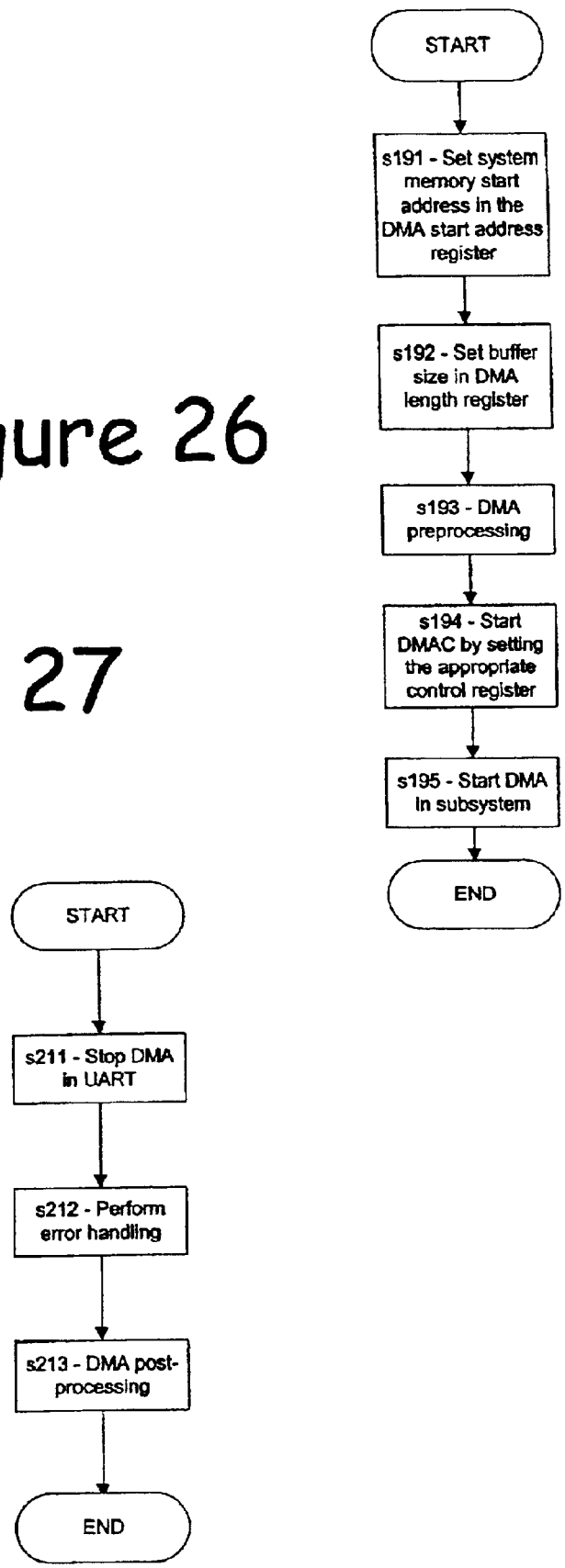
Figure 26
Figure 28

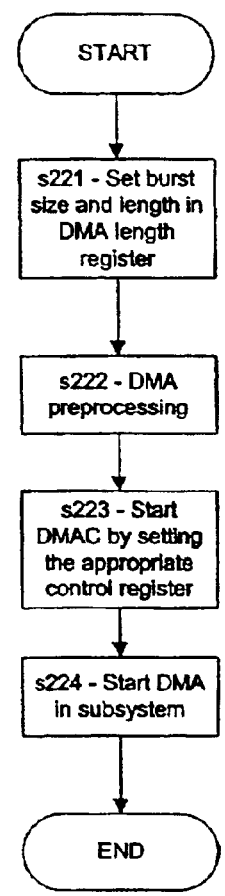
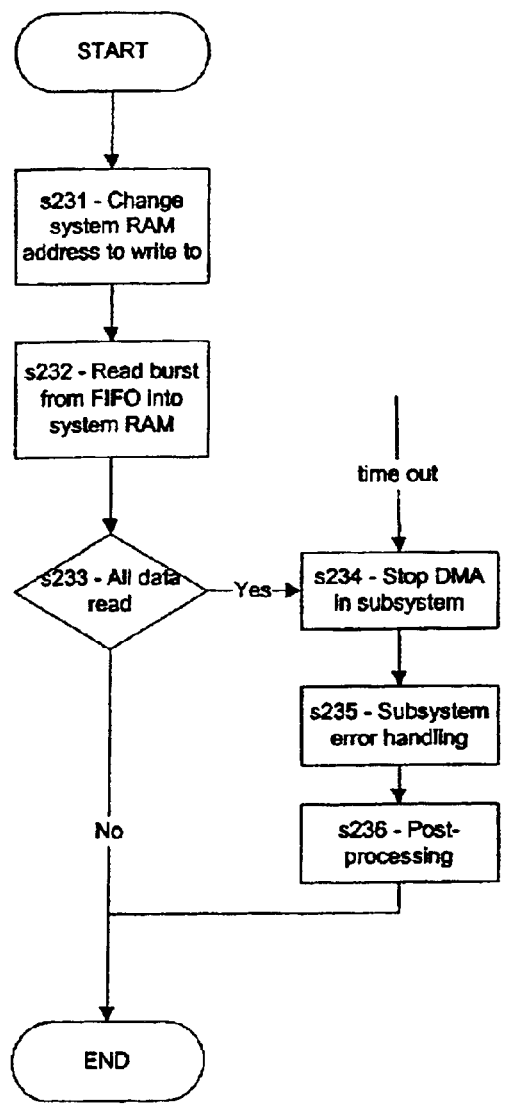
Figure 29
Figure 30

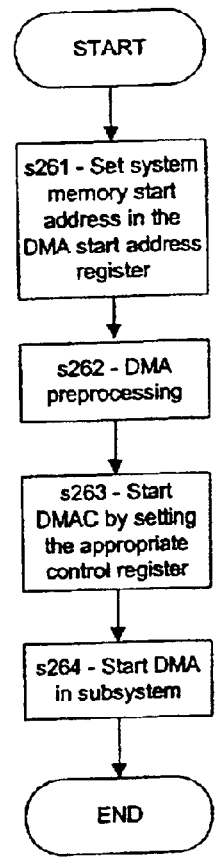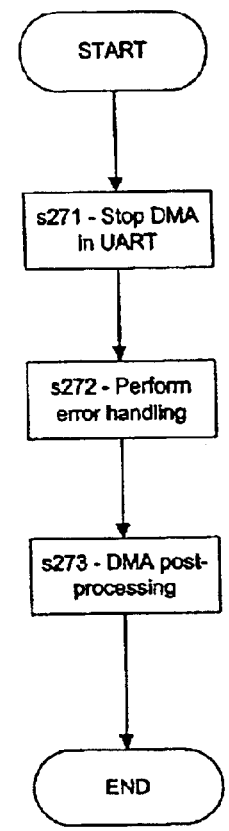
Figure 33
Figure 34

PROVIDING A BURST MODE DATA TRANSFER PROXY FOR BRIDGING A BUS

BACKGROUND OF THE INVENTION

1. Field of the Invention

The present invention relates to a computer system component and, more particularly, to a burst mode data transfer proxy for bridging a bus operable in burst mode and a single transfer mode bus.

2. Description of the Prior Art

It has been proposed to fork a system or local bus into parallel fast and slow buses. This has the advantage of preventing the actual speed of the fast bus being reduced by slow devices accessing it. Furthermore, the system and fast buses typically support burst mode data transfer. If these buses are to be used with relatively slow devices, they must both support single transfer mode transfers or the slow devices must be provided with their own means for building and disassembling bursts.

SUMMARY OF THE INVENTION

It is an object of the present invention to ameliorate the aforementioned problems and to this end, there is provided a computer system component comprising a burst mode data transfer proxy for bridging a bus operable in burst mode and a single transfer mode bus. Thus, the computer system components stands as a proxy for a device on the single transfer mode bus in respect to data transfer from a device on the burst mode bus. This allows the device on the burst mode bus to use burst mode, even when this mode is not supported by the receiving device on the single transfer mode bus.

Preferably, a computer system component according to the present invention comprises:

remotely programmable control register means, a plurality of buffers (e.g. FIFOs implemented in random access memory) for buffering data transfers between a burst mode bus and a single transfer mode bus;

a first burst mode bus interface operable in dependence on control data in said register means for interfacing the said buffers to a first burst mode bus; and a single transfer mode bus interface operable in dependence on control data in said register means for interfacing said buffers to a single transfer mode bus.

The buffers mean that the devices on the single transfer mode bus do not need to provide their own buffering for data bursts.

More preferably, a computer system component according to the present invention also includes a second burst mode bus interface operable in dependence on control data in said register means for interfacing the said buffers to a second burst mode bus.

Preferably, a random access memory forming the buffers is dual port random access memory, the first burst mode bus interface and the single transfer mode interface sharing one port of the random access memory and the second burst mode bus interface using an other port of the random access memory. More preferably, the locations and sizes of said FIFOs in the random access memory are defined by data in said control register means. Thus, the FIFO are reconfigurable and can be adapted as circumstances change.

Preferably, the first burst mode bus interface is configurable, by means of said control registers means, to allow a remote device to write a burst of data directly to cells forming one of said buffers.

Preferably, the first burst mode bus interface is configurable, by means of said control registers means, to allow a remote device to read a burst of data directly from cells forming one of said buffers.

Preferably, the burst mode bus interfaces are configurable, by means of said control registers means, to read a burst data from one of said buffers and write the burst of data to a remote address via a burst mode bus, the remote address and the buffer being determined by data in said control register means.

Preferably, the burst mode bus interfaces are configurable, by means of said control registers means, to read a burst of data from a remote address via a burst mode but and write the burst of data to one of said buffers, the remote address and the buffer being determined by data in said control register means.

Preferably, the single transfer mode bus interface is configured for reading data from the head of a FIFO and writing the data to a remote address, identified by a FIFO to address mapping provided by said control registers, via a single transfer mode bus.

Preferably, a computer system component according to the present invention includes direct memory access control means responsive to direct memory access request signals and the single transfer mode bus interface is operable in a response to a direct memory access request signal received by the direct memory access means to transfer data from a remote address to one of said FIFOs via a single transfer mode bus. More preferably, the control registers are programmable such that the FIFO is selected in dependence on the source of the direct memory access request signal.

Preferably, a computer system component according to the present invention includes direct memory access control means responsive to direct memory access request signals and the single transfer mode bus interface is operable in a response to a direct memory access request signal received by the direct memory access means to transfer data to a remote address from one of said FIFOs via a single transfer mode bus. More preferably, the control registers are programmable such that the FIFO is selected in dependence on the source of the direct memory access request signal.

Preferably, the first burst mode bus interface and the single transfer mode bus interface are configured to bypass the FIFOs for single transfer mode transfers between a burst mode bus connected to the first burst mode bus interface and a single transfer mode bus connected to the single transfer mode bus interface. More preferably, the first burst mode bus interface discriminates said single transfer mode transfers from burst mode transfers by means of the associated address signals.

More preferably still, the single transfer mode interface is configured to limit access to a single mode transfer bus connected thereto for single transfer mode transfers from a burst mode bus connected to the first burst mode bus interface. Yet more preferably, the single transfer mode interface increments a counter by a value in a predetermined one of said control registers for each cycle of a clock during which a single transfer mode transfer is taking place, bypassing the FIFOs and prevent access to said single transfer mode bus when the count reaches threshold defined in a predetermined one of said control registers, the count being decremented by one for each cycle of said clock when no such single transfer mode transfer is taking place.

According to the present invention, there is provided peripheral circuit for use in a computer apparatus, the circuit comprising:

a computer system component according to the present invention, comprising:
remotely programmable control register means,
a plurality of buffers (e.g. FIFOs implemented in random access memory) for buffering data transfers between a burst mode bus and a single transfer mode bus;
a first burst mode bus interface operable in dependence on control data in said register means for interfacing the said buffers to a first burst mode bus; and
a single transfer mode bus interface operable in dependence on control data in said register means for interfacing said buffers to a single transfer mode bus;
a first burst mode bus connected to the second burst mode bus interface of the computer system component;
a single transfer mode bus connected to the single transfer mode bus interface of the computer system component; and
an interface circuit for interfacing said peripheral circuit to a second burst mode bus;
wherein effectively connects the first burst mode bus or the first burst mode bus interface of the computer system component to the second burst mode bus in dependence on an address associated with a data transfer via the interface circuit.

Preferably, a peripheral circuit according to the present invention includes an SDRAM accessible via the first burst mode bus and/or a subsystem having direct access to the first burst mode bus for the transfer of signal data and direct access to the single transfer mode bus for the transfer of control data and/or a subsystem having direct access to the single transfer mode bus for the transfer of both signal data and control data.

According to the present computer system including a central processing unit, a burst mode bus accessible to the central processing unit and a peripheral circuit according to the present invention, wherein said interface circuit interfaces said burst mode bus accessible to the central processing unit to said first burst mode bus and said computer system component.

BRIEF DESCRIPTION OF THE DRAWINGS

FIGS. 26, 27 and 28 illustrate a eighth operational mode of the direct memory access controller of FIG. 4;

FIGS. 29 and 30 illustrate a ninth and tenth operational mode of the direct memory access controller of FIG. 4;

FIGS. 33 and 34 illustrate a thirteenth, fourteenth, fifteenth and sixteenth operational mode of the direct memory access controller of FIG. 4;

DETAILED DESCRIPTION OF THE PREFERRED EMBODIMENTS

Embodiments of the present invention will now be described, by way of example, with reference to the accompanying drawings.

Figure 1:
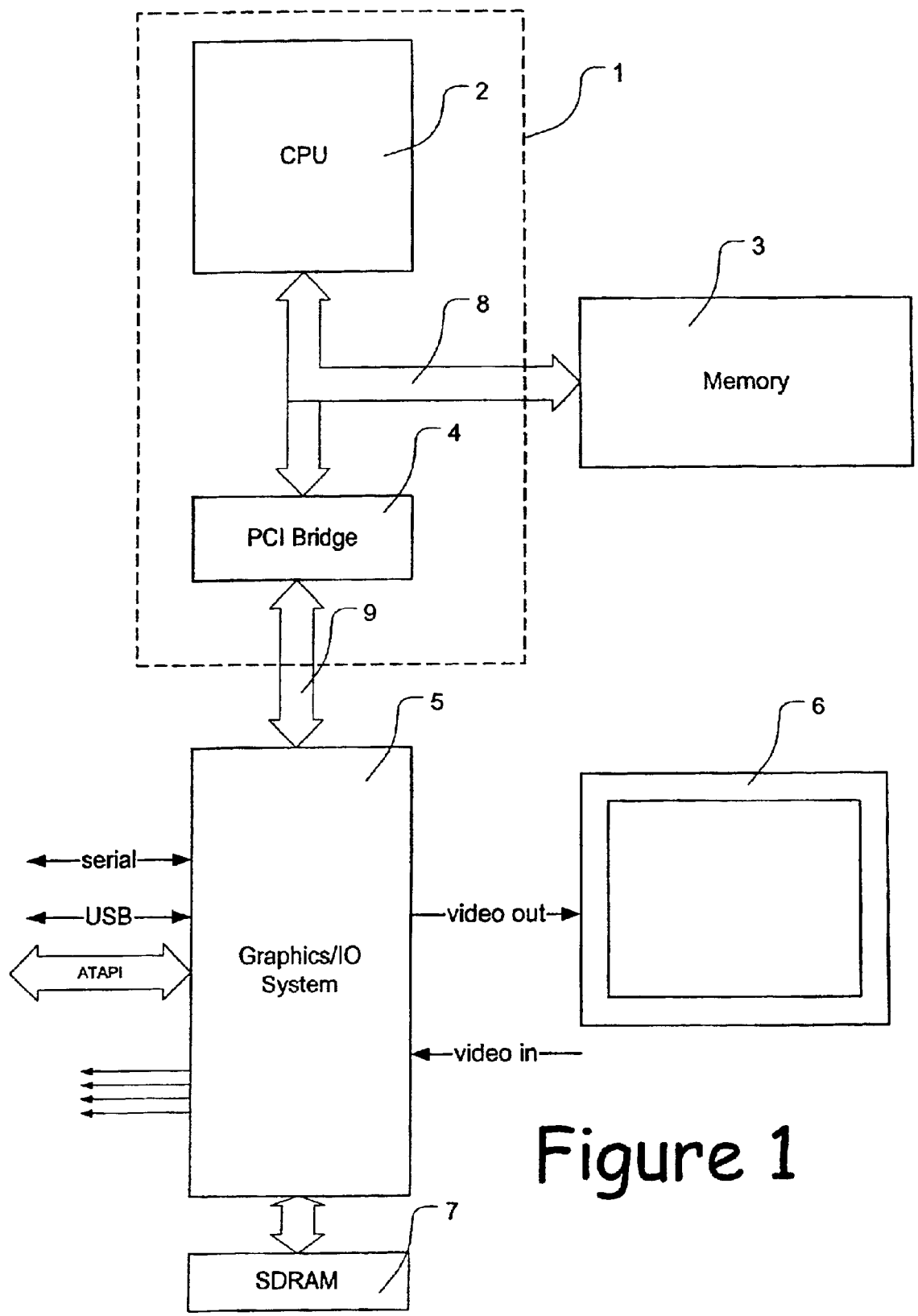
FIG. 1 is a block diagram of a first computer system according to the present invention.

Referring to FIG. 1, a first computer system comprises, inter alia, a Hitachi SH4 1, including a central processing unit 2 and a PCI bridge 4, system RAM 3, a graphics/IO system 5, a liquid crystal display (LCD) panel 6 and UMA SDRAM 7. The central processing unit 2, the system RAM 3 and the PCI bridge 4 are interconnected by a system bus 8. The PCI bridge 4 connects the system bus 8 to a PCI bus 9 to which the graphics/IO system 5 is connected. The graphics/IO system 5 has a digital video output for driving the LCD panel 6 and access to the UMA SDRAM 7. The graphics/IO system 5 has numerous input and output ports.

Figure 2:
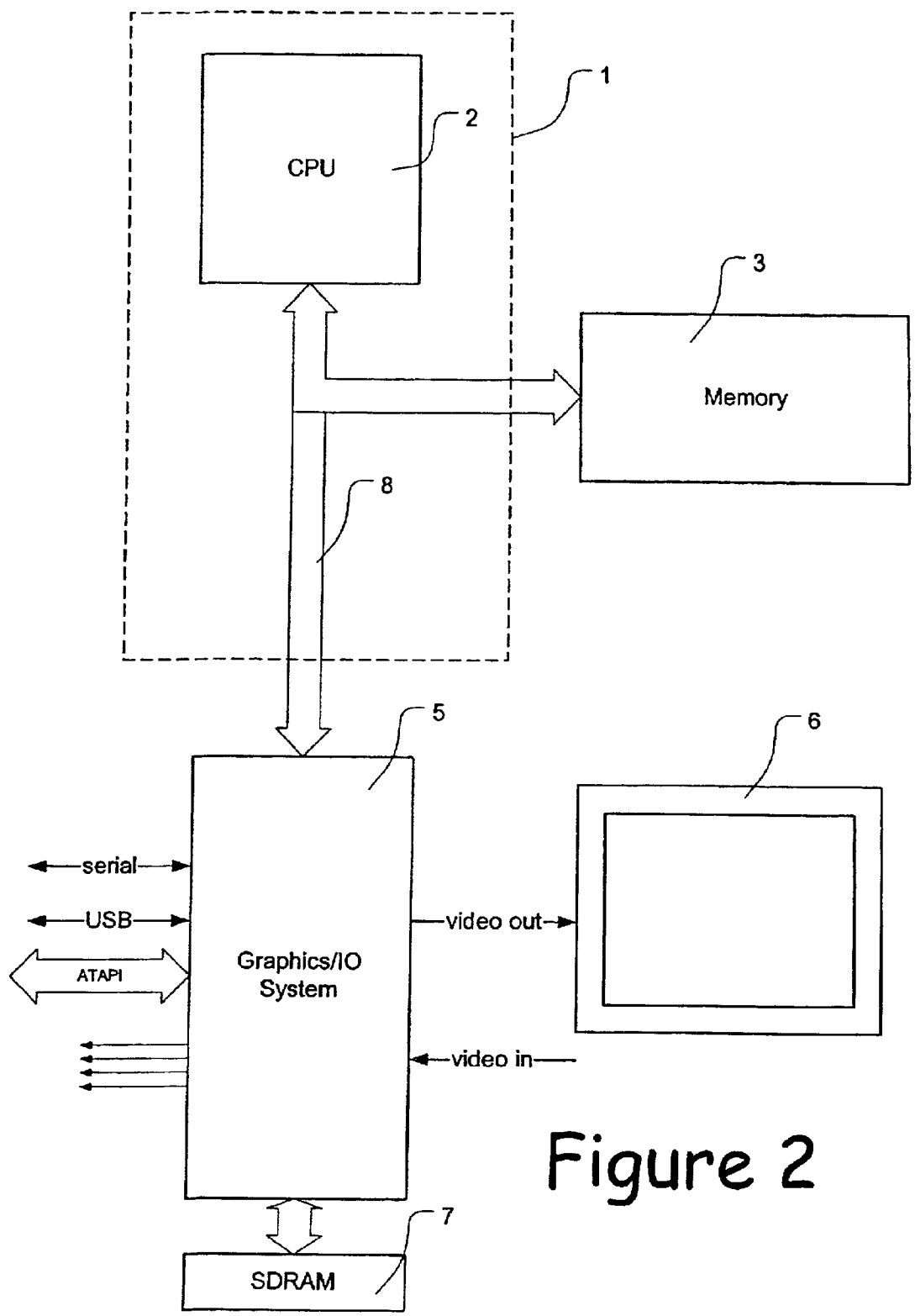
FIG. 2 is a block diagram of a second computer system according to the present invention.

Referring to FIG. 2, a second computer comprises, inter alia, a Hitachi SH 4 1, including a central processing unit 2, system RAM 3, a graphics/IO system 5, a liquid crystal display (LCD) panel 6 and UMA SDRAM 7. The central processing unit 2, the system RAM 3 and the graphics/IO system 5 are connected by a Hitachi MPX bus 8. The graphics/IO system 5 has numerous input and output ports.

Figure 3:
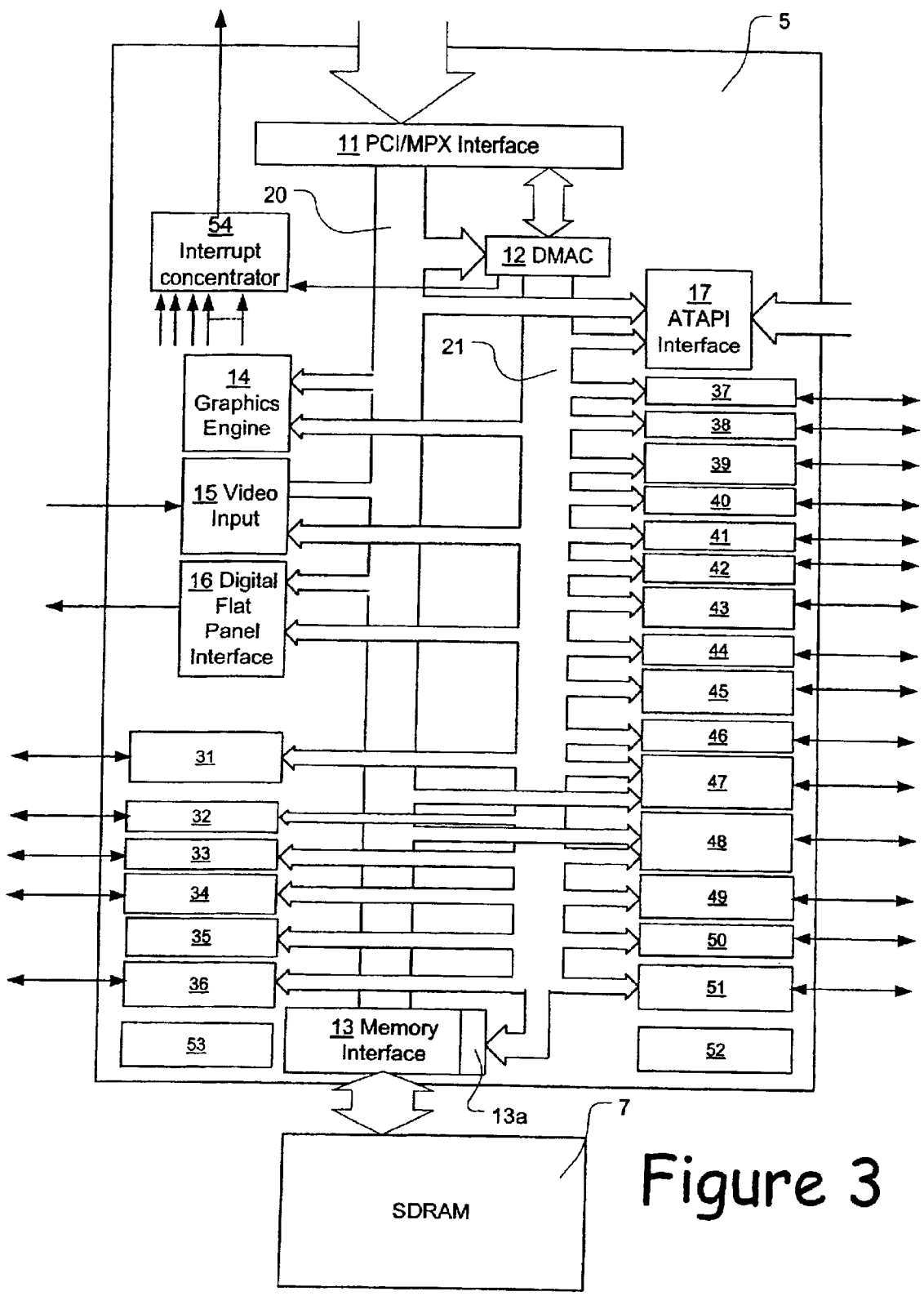
FIG. 3 is a block diagram of the graphics/IO system used in the computer systems of FIGS. 1 and 2.

Referring to FIG. 3, the graphics/IO system 5, used in both of the above-described computer systems, comprises a PCI/MPX interface 11, a direct memory access controller 12, a memory interface 13, a graphics engine 14, a video input interface 15, a digital flat panel interface 16, an ATAPI interface 17, and first to twenty first IO subsystems 31, ..., 51. A 32-bit, synchronous, high-speed (99 MHz/100 MHz), burst mode bus ("the pixel bus") 20 interconnects the PCI/MPX interface 11, the direct memory access controller 12, the graphics engine 14, the video input interface 15, the digital flat panel interface 16, and an ATAPI interface 17 and the seventeenth and eighteenth IO subsystems 47, 48. A power control and configuration subsystem 52 contains registers for controlling the operation of the graphics/IO system 5.

A synchronous, slower (33 MHz or 50 MHz depending on whether the external bus is a PCI bus or an MPX bus), 32-bit bus 21 ("the register bus"), that does not operate in burst mode, interconnects the direct memory access controller 12, the graphics engine 14, the video input interface 15, the digital flat panel interface 16, the ATAPI interface 17, and the IO subsystems 31, ..., 51.

The pixel bus 20 is used for the transfer of blocks of data, primarily video data but also audio and program data, to and from the UMA SDRAM 7, at high speed, whereas the register bus 21 is used for data transfers comprising single words or slow sequences of words. For instance a control signal, comprising a single word, to one of the IO subsystems 31, ..., 51 would be sent via the register bus 21. Similarly, slow image data from a serial interface would also be sent via the register bus 21 as a sequence of words in respective data transfer operations.

The subsystems connected to the pixel bus 20 are responsible for their DMA ("direct memory access") addresses for data transfers and maintain their own internal FIFOs for assembling and disassembling data bursts.

The pixel bus 20 operates with separate command and transfer phases allowing a command to be transmitted before a previous command has been executed. The pixel bus 20 contains separate write and read buses enabling concurrent use of the bus for two transfers. The pixel bus 20 is synchronized with the PCI bus 9 or MPX bus 8, whichever services the graphics/IO system 5 in the particular implementation, and arbitration is performed in parallel with data transfer. Each subsystem 12, 13, 14, 15, 16, 17, 47 and 48, connected to the pixel bus 20, may act as the bus master.

Access to the pixel bus 20 is controlled by a conventional arbiter 53. The arbitration algorithm combines fixed and round robin arbitration to allow for both real-time access, e.g. for the video input interface 15, and non-real-time access, e.g. for the graphics engine 14.

The register bus 21 requires 2 clock cycles to do a read or write. The first clock cycle being the address phase and the second being the data phase. The register bus 21 is synchronized to the PCI bus 9 or the MPX bus 8, whichever is servicing the graphics/IO system 5, and arbitration takes place in parallel with transfers. The direct memory access controller 21 is always the bus master for the register bus 21.

The graphics engine 14 operates at 99 MHz or 100 MHz, depending on the speed of the pixel bus 20, and can perform BitBLT (source+destination=>destination), allowing the logical combination of the source area with the destination area. Other supported functions include:

alpha value to color expansion, in which an image described as a 4 bpp ("bits per pixel") intensity value is converted into a color image where the resultant pixels are a proportions of the foreground color and the background image where the proportions are defined by the 4-bit alpha value, binary to color expansion in which a 1 bpp image is converted into a color image where the color is provided by the foreground and background colors, (iii) pre and post hardware clipping in which lines that are completely outside the clipping window are removed and then lines that are partially outside the clipping window are removed,
(iv) Bresenham line drawing,
(v) raster operations,
(vi) patterning by tiling a destination with copies of a source image,
(vii) linear addressing,
(viii) 8/16 bpp,
(ix) anti-aliased fonts using sixteen levels of alpha blending,
(x) rotation, and
(xi) zooming.

The video input interface 15 includes an ITU-R BT.656 interface operating at 27 MHz and supports colour space conversion and dithering from 4:2:2YCrCb to RGB 5:6:5. The video input interface can capture odd or even fields or both fields and can process both fields together in a single frame A sub-pixel interpolator is provided for resolution scaling. A 9-tap horizontal programmable decimations filter and a 2-tap vertical interpolator for scaling up or down by a factor of three are provided. Additionally, triple frames are supported for frame rate conversion.

The digital flat panel interface 16 is an 18-bit RGB interface supporting dual planes, both 8/16 bpp) with additional picture-in-picture on the background plane. The foreground and background planes can be alpha blended and chroma-keying can be performed. Dual 64×64 hardware cursors are provided. The backplane can be scrolled, i.e. the backplane canvas is larger than the visible region of the backplane, and is wrapped. Automatic double/triple buffering switching is provided for the video/graphics planes. Displays of up to 854×480 pixels are supported and the refresh rates are programmable. VSYNCH, HSYNCH and display enable signals are also output.

The memory interface 13 has multi-bank activation for reduced pre-charge and activation delays and overlapping SDRAM command access, although this can be disabled to improve latency at the expense of bandwidth. Up to 128 Mbytes of SDRAM are supported and the memory interface operates in synchronism with the pixel bus.

The ATAPI interface 17 has primary channel and master/slave support. The I/O interface operates at 3.3V and IO modes 0–4, multiword DMA modes 0–2 and Ultra DMA modes 0–2 are supported.

The first subsystem 31 can be configured by setting a control register in the power control and configuration subsystem 52 to provide, on the one hand, two interrupts, two pulse width modulators, two Hitachi serial protocol interfaces and a general programmable IO port and an AVLINK interface on the other. The interrupt inputs convert input signals to a single interrupt to the central interrupt controller by detecting edges or levels. The two pulse width modulators have programmable source clock frequencies giving cycle times from 30 ns with a PCI bus and 20 ns for an MPX bus, to 2 minutes. The high value and duration (8 bits) are also programmable.

The AVLINK interface can send digital audio/video data, organised into variable length packets to a suitable audio/video decoder. The start of each packet can be signalled to the audio/video decoder and packets in error can also be identified. The audio/video decoder can control the rate at which data is sent by means of a data request input to the module.

The second and third subsystems 32, 33 can be configured by setting a control register in the power control and configuration subsystem 52 to provide, on the one hand, a general programmable IO port and a pulse width modulator, as described above, on the other.

The fourth subsystem 34 can be configured by setting a control register in the power control and configuration subsystem 52 to provide, on the one hand, three interrupts and, on the other, a Hitachi serial protocol interface. The Hitachi serial protocol interface can be configured to operate in either master mode or slave mode and has a programmable data rate.

The fifth subsystem 35 is a color space converter which can take in input video signal in YUV or DELTA YUV format and output is as an RGB (R:5 bits, G:6 bits, B:5 bits) signal. This function can only be used with DMA transfer or video data.

The sixth subsystem 36 can be configured by setting a control register in the power control and configuration subsystem 52 to provide, on the one hand, an OS8104 interface and an expansion bus interface on the other. It can be configured for MOST or SRAM type interfaces and unsupervised hardware flow control to the OS8104 mode. Connection of additional peripherals is allowed in the SRAM mode.

The seventh subsystem 37 provides two Hitachi I2C interfaces which can be selected by means of a register in the subsystem itself. Each interface can operated as a 7-or-10 bit compatible master or slave, at speeds up to 400 Kbits/sec. They support the Philips I2C bus interface and have programmable clocks derived from the register bus clock.

The eighth subsystem 38 provides a serial sound. The serial sound interface supports multi-channel and compressed data, programmable frame size and the Philips format.

The ninth subsystem 39 can be configured by setting a control register in the power control and configuration subsystem 52 to provide, on the one hand, an HCAN (Hitachi Controller Area Network) interface and a UART and a Hitachi serial protocol interface on the other. The HCAN interface supports CAN Specification 2.0A and 2.0B, Standard Data and Remote Frames (11-bit identifier), Extended Data and Remote Frames (29-bit identifier), 32 independent message buffers, using standard (11 bits) or extended (29 bits) identifier format, 31 mailboxes, programmable for the direction of transmit or receive, 1 receive-only mailbox, acceptance filtering by identifier (Standard Message Identifier or Extended Message Identifier), sleep mode for low power consumption, programmable Local Acceptance Filter Mask (standard and extended identifier) supported by all mailboxes, programmable CAN data rate up to 1 Mbit/s, transmit message queuing with internal priority sorting mechanism against the problem of priority inversion for real-time applications, data buffer access without handshake requirement, 16-bit free running timer with flexible clock sources and pre-scaler, 3 Timer Compare Match Registers, CAN-ID Compare Match, 2 Input Capture Registers, Drift Correction Registers, Local Offset Register, 4-bit Basic Cycle Counter for Time Trigger Transmission, Timer Compare Match Registers with interrupt generation and timer/counter clear/set capability to support schedule-monitoring of transmit/receive, one-shot transmission at a specific time, etc., CAN-ID Compare Match with Timer Clear/Set plus Input Capture Register Disable when receiving a specific CAN Frame, Input Capture Registers used for TimeStamp and Global Synchronisation on a CAN system, interacting with SOF/EOF of CAN Frame and CAN-ID Compare Match, Flexible TimeStamp for both transmission and reception (stamp-timing programmable), Time-Trigger Transmission (Periodic Transmission supported on top of Event Trigger Transmission), and Timer Counter and Basic Cycle value embedded into a CAN frame and transmitted.

The tenth subsystem 40 provides a UART and an irDA interface which can be selected by means of a register in the subsystem itself. The irDA interface is implemented by configuring one channel of the UART and is SIR (Slow IrDA:115.2 Kbps) compatible.

The eleventh and twelfth subsystems 41, 42 can both be configured by setting a control register in the power control and configuration subsystem 52 to provide, on the one hand, a serial sound interface as described above and a UART on the other.

The thirteenth subsystem 43 can be configured by setting a control register in the power control and configuration subsystem 52 to provide, on the one hand, an interrupt and two UARTs and an AC97 interface on the other. The AC97 interface provides a digital interface to a single AC97 version 2.1 audio codec, PIO from status slots 1 and 2 of the Rx frame, PIO to command slots 1 and 2 of the Tx frame, PIO from data slots 3 and 4 of the Rx frame, PIO to data slots 3 and 4 of the Tx frame, selectable 16-or-20 bit DMA from data slots 3 and 4 of the Rx frame, selectable 16-or-20 bit DMA to data slots 3 and 4 of the Tx frame, support for variable sample rates by qualifying slot data with Tag bits and responding to Rx frame slot request bits for the Tx frame, interrupt generation for data ready/required and overrun/underrun, and a 12.3-MHz data clock input.

The fourteenth subsystem 44 comprises two selectable interrupts.

The fifteenth subsystem 45 comprises a timer/counter module. The timer/counter module comprises a four programmable 32-bit free running timers and four input captures/output compares. I/O pins of the timers can be used for general programmable IO.

The sixteenth subsystem 46 comprises two selectable pulse width modulators as described above.

The seventeenth subsystem 47 comprises a USB host and the eighteenth subsystem 48 can be configured as a USB host or a USB function by means of a register in the eighteenth subsystem 48. The USB subsystems 47, 48 support 1.5 Mbits/s and 12 Mbits/s data transfer rates, USB version 1.1 for host and function, and OHCI version 1.0. A 48-MHz clock is provided via either external clock input or a local crystal oscillation. Transmit and receive buffers are in the UMA SDRAM 07 and accessible directly via the pixel bus 20.

The nineteenth subsystem 49 comprises a Hitachi S/PDIF Interface with separate transmitter and receiver and which supports the IEC 60958 communications standard. The receiver automatically detects IEC 6937 compressed mode data.

The twentieth subsystem 50 comprises an HCAN interface as described above.

The twenty first subsystem 51 provides selectively, by means of a register in the subsystem itself, a serial sound interface or a serial sound interface and CD-ROM block decoder.

The configuration of subsystems in dependence on the register in the power control and configuration subsystem 52 is such that there can be a maximum of 4 pulse width modulators, a maximum of three Hitachi serial protocol interfaces, and a maximum of three UARTs. Up to two serial sound interfaces on the graphics/IO system 6 may be configured as general programmable IO.

An interrupt concentrator 54 receives interrupt requests from the various subsystems of the graphics/IO system and forwards them to a single interrupt request port of the central processing unit 2.

The register bus 21 is also connected to the memory interface 13 for loading control data into the memory interface's control registers 13. The memory interface 13 does not provide access to the UMA SDRAM 7 to the register bus 21.

The PCI/MPX bus interface 11 routes data transfer from the external bus (the PCI bus 9 or the MPX bus 5) to the UMA SDRAM 7 via the pixel bus 20, buffering data from the external bus to fill bursts where possible. Data transfers involving the graphics engine 14, the video input interface 15, the digital flat panel interface 16, the ATAPI interface 17, the seventeenth and eighteenth subsystems 47, 48 are routed via the UMA SDRAM 7. In other words, data from one of these subsystems must be written to the UMA SDRAM 7 before it is accessible to the central processing unit 2. Similarly, the central processing unit 2 must write data, destined for one of these subsystems which must first be written to the UMA SDRAM 7. Nevertheless, control codes can be routed to these subsystems via the direct memory access controller 12 and the register bus 21.

The direct memory access controller 12 organizes the data transfer between SMA-capable subsystems on the register bus 21 and external memory, i.e. the system RAM 3 and the UMA SDRAM 7, or other subsystems on the register bus 21. More particularly, the direct memory access controller 12 supports four DMA modes, master DMA mode, slave DMA mode, inter-subsystem DMA mode and external MDA mode. External DMA mode is only used where the external bus is an MPX bus 5. Master DMA mode transfers to the system RAM 3 are not available when the external bus is an MPX bus.

In master DMA mode, the direct memory access controller 12 acts as the bus master for either the external bus or the pixel bus 20 and transfers data between a subsystem on the register bus 21 and external memory.

In slave DMA mode, the direct memory access controller 12 acts as slave on the external bus and transfers data between a subsystem on the register bus 21 and an internal FIFO DMA channel buffer (described in more detail below). The central processing unit 2 is responsible for transferring data from a FIFO DMA channel buffer to system RAM 3, for which it uses PIO (programmable IO) access, employing burst or single access mode.

In inter-subsystem DMA mode, the direct memory access controller 12 transfers data between subsystems on the register bus 21.

In external DMA mode, the direct memory access controller of the central processing unit 2 conducts DMA operation using a single allocated DMA channel of the direct memory access controller 12 and transfers data between a subsystem and system RAM 3.

DMA data transfers always occur between a primary DMA address and a secondary DMA address. The primary DMA address is always a register address of a subsystem on the register bus 21. The secondary DMA address is either an external memory address or a register address of a subsystem on the register bus 21.

Figure 4:
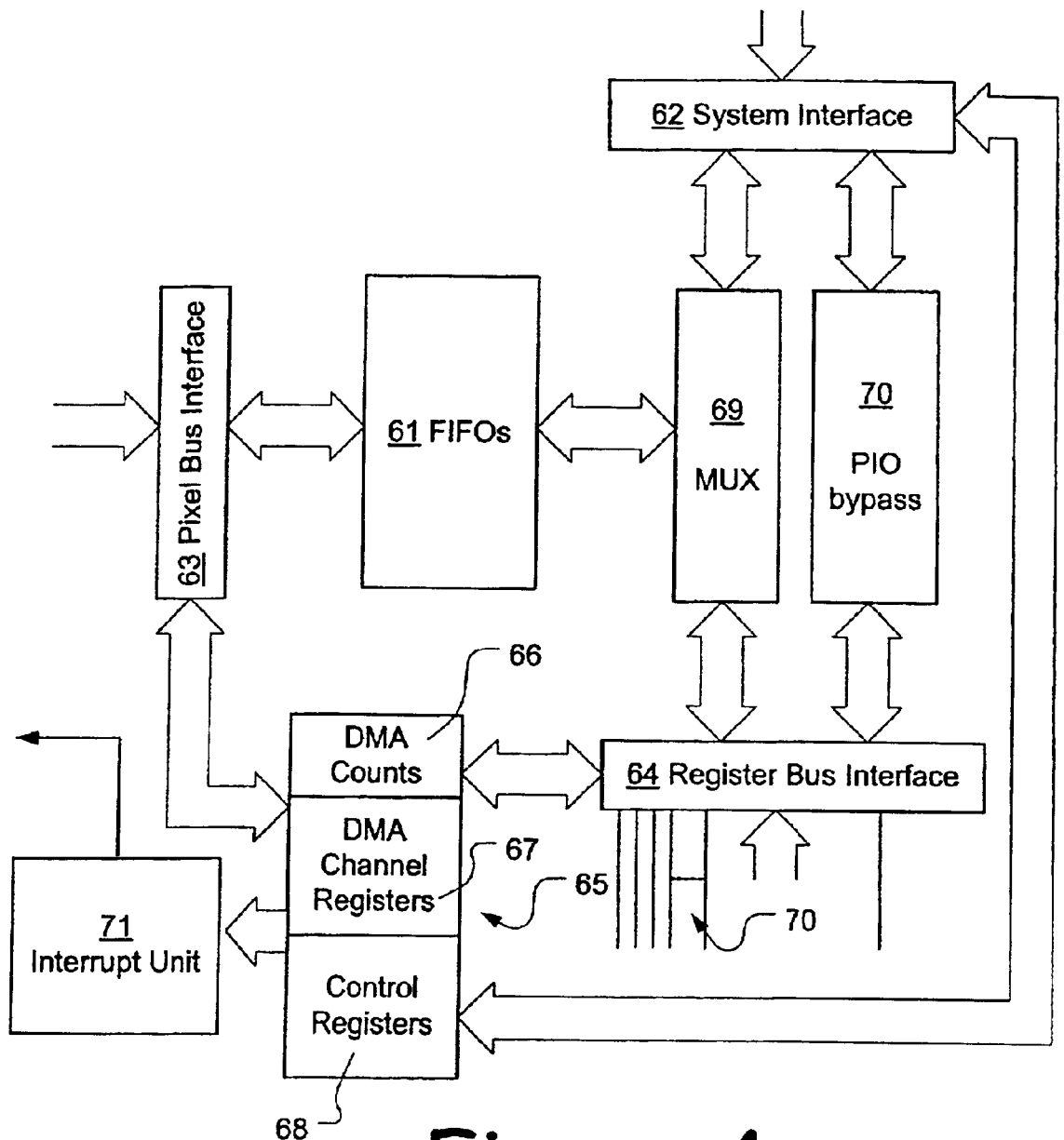
FIG. 4 is a block diagram of the direct memory access controller of the graphics/IO system of FIG. 3.

Referring to FIG. 4, the direct memory access controller 12 comprises sixteen reconfigurable FIFOs 61 corresponding to sixteen DMA channels, implemented using an block of RAM, a system interface 62 for communication with the PCI/MPX interface 11, a pixel bus interface 63 for communication using the pixel bus 20 and a register bus interface 64 for communication using the register bus 21. A set of registers 65 comprises DMA count registers 66 for controlling operation of the sixteen DMA channels, DMA channel registers 67 for storing the configuration data defining the FIFOs 61 and control registers 68 for storing control values used by the direct memory access controller 12. These registers 65 are accessible to the system, pixel bus and register bus interfaces 62, 63, 64 for controlling their operations.

The RAM implementing the FIFOs 61 is dual port with one port used by the pixel bus interface 63. The other port of the RAM is shared between the system interface 62 and the register bus interface 64 by a multiplexer 69.

A programmed IO ("PIO") bypass channel 70 is provided between the system interface 62 and the register bus interface 64. The PIO bypass channel 70 enables the central processing unit 2 (see FIGS. 1 and 2) to communicate with the subsystems connected to the register bus 21 without involving the FIFOs 61.

An interrupt unit 71 receives the various interrupts produced within the direct memory access controller 12 and output a single interrupt to the interrupt concentrator 54 (FIG. 3).

Figure 5:
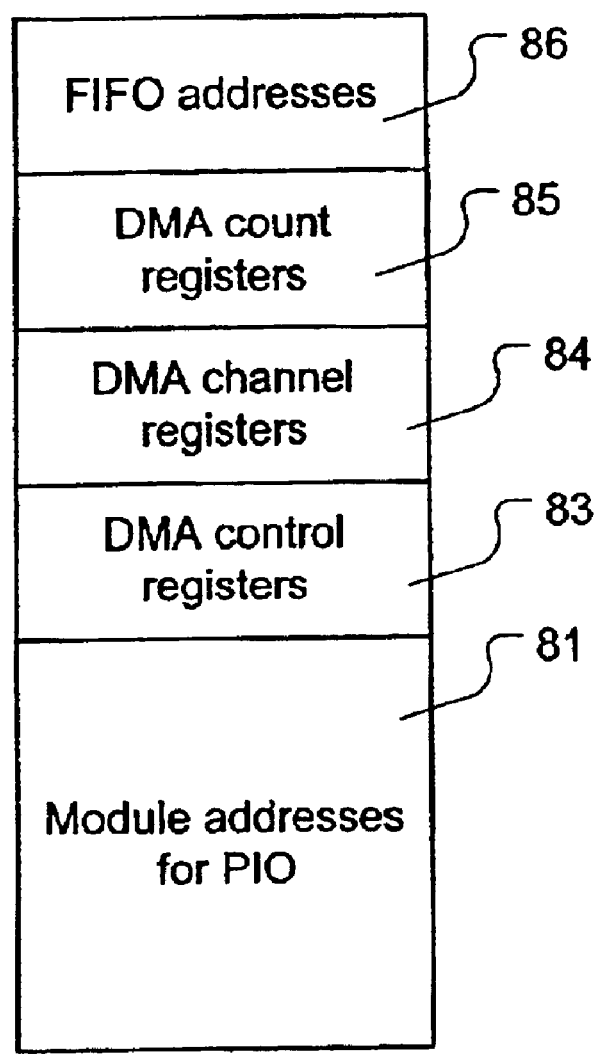
FIG. 5 illustrates the address space relevant to the operation of the direct memory access controller of the graphics/IO system of FIG. 3.

Referring to FIG. 5, the direct memory access controller's 32-bit address space comprises, in order from the bottom, a subsystem addresses block 81 containing addresses mapped onto subsystems connected to the register bus 21, a DMA control block 83 containing the DMA control registers' addresses, a DMA channel block 84 containing the addresses of the registers defining the FIFOs 61, a DMA count block 85 containing registers for holding counts used in DMA transfers and, at the top, a FIFO block 86 containing the addresses of the FIFOs 61.

The space allocated to each subsystem in the subsystem addresses block 81 depends on the number of registers and/or amount of memory in each subsystem. In the present example, the graphics engine 14 is allocated 16,384 bytes, the video input 15 is allocated 256 byte, the digital flat panel interface 16 is allocated 4096 bytes, the ATAPI interface is allocated 256 bytes, the UART in the tenth subsystem 40 is allocated 32 bytes and the USB host/function subsystem 48 is allocated 1024 bytes.

The DMA control block 83 comprises a set of 4-byte words providing DMA external select, DMA status, DMA FIFO status, DMA FIFO flush, PIO monitor, PIO monitor status, DMA subsystem request status and DMA interrupt source registers and thirty one DMA subsystem request address registers.

The DMA channel block 84 comprises four 4-byte control words, acting as registers, for each FIFO 61. The registers are the DMA start address registers, the DMA length registers, the DMA control registers and the DMA RAM buffer size register. The bits of each of these registers are organised as follows:

DMA Start Address Registers

These registers are only used in the master and inter-subsystem modes.

Master Mode

| Bit | Bit Name | Initial Value | R/W | Description |
|---|---|---|---|---|
| 31 to 2 | Start Address | 0 | R/W | These bits hold the DMA start address in external memory. |
| 1 to 0 | Request Number | 0 | R/W | These bits are always set to 0. |

Inter-module DMA mode

| Bit | Bit Name | Initial Value | R/W | Description |
|---|---|---|---|---|
| 31 to 5 | — | 0 | R/W | Not used. |
| 4 to 0 | Request Number | 0 | R/W | These bits specify the secondary DMA address being used indirectly by the DMA request number associated with the receiving subsystem. The actual secondary DMA address is specified in the associated register mapping DMA request numbers onto addresses. |

DMA Length Register

| Bit | Bit Name | Initial Value | R/W | Description |
|---|---|---|---|---|
| 31 to 22 | — | 0 | R | Not used. |
| 21 to 16 | Burst Size | 0 | R/W | The number of longwords available in the FIFO channel buffer or the number of longwords of space available in FIFO channel buffer that cause the corresponding burst flag to be asserted. Burst size is only used to set the threshold at which the FIFO burst status flag in the DMA FIFO Status Register is set. If this register is set at half the buffer size defined in the relevant buffer size register then the flag will operate as a half full or half empty flag or interrupt. The flag or interrupt operates as a part full flag if the channel is set to write to subsystem and part empty if the channel is set up as read from subsystem. The maximum burst size is 63 longwords. Burst size is only valid in slave mode and external DMA mode.. |
| 15 to 2 | DMA Length | 0 | R/W | DMA Length specifies length of DMA transfer in longwords except in continuous data transfer in slave and inter-subsystem modes. |
| 1, 0 | 0 | 0 | R/W | Always 00. |

DMA Control Registers

The control register for each DMA channel, which contain the control values controlling the operation of the direct memory access controller 12 for a transfer, is arranged as follows:

| Bit | Bit Name | Initial Value | R/W | Description |
|---|---|---|---|---|
| 31 to 22 | — | 0 | R | Not used |
| 20 to 16 | CSEL | 0 | R/W | Channel Select (CSEL) These bits specify the primary DMA Request Number of the DMA channel. The Primary DMA Address is specified in the associated DMA request address register. Data transfer direction is specified in DR flag of this register. Secondary DMA address is specified in the DMA start address register. |
| 15 | ENDD | 0 | R/W | Endian |
| 14 | ENDS | 0 | R/W | These flags specify external memory byte data alignments of the source and destination data. If Little Endian is specified, the direct memory access controller 12 will re-align the data on the fly, except for the inter-subsystem DMA mode in which endian conversion will not be conducted. Bit 15: Destination Data alignment (ENDD) This flag specifies the Endian of data in the destination address. If destination is not External memory, this flag is invalid and should be 0. 1: Big Endian 0: Little Endian Bit 14: Source Data alignment (ENDS) This flag specifies the Endian of data in the source address. If source is not External memory, this flag is invalid and should be 0. 1: Big Endian 0: Little Endian |
| 21 | PTEN | 0 | R/W | Interrupt Enable |
| 13 | FBEN | 0 | R/W | These flags are used to specify whether terminal count interrupt (TC), subsystem terminal count (PT), FIFO status interrupt (FSEN) and FIFO burst status interrupt (FBEN) will be asserted or not when the specific condition will be met. Bit 21: Subsystem Terminal Count Interrupt Enable (PTEN) 1: PT interrupt will be asserted when DMA data transfer between a subsystem on the register bus 21 and a FIFO Channel Buffer n is completed. 0: Subsystem Terminal Count interrupt is disabled. Subsystem Terminal Count interrupt does not work in continuous data transfer mode. Subsystem Terminal Count also does not work in Master DMA mode where DR bit equals to 0. So in those modes, PTEN should be disabled. Bit 13: FIFO Burst Interrupt Enable (FBEN) 1: FIFO Burst interrupt will be asserted when either burst read or burst write operation condition is met for the FIFO Channel Buffer. 0: FIFO Burst interrupt is disabled. FBEN flag only works in Slave DMA mode. So in other modes, FBEN should be disabled. |
| 12 | FSEN | 0 | R/W | |
| 11 | TCEN | 0 | R/W | |

-continued

| Bit | Bit Name | Initial Value | R/W | Description |
|---|---|---|---|---|
| | | | | Bit 12: FIFO Status Interrupt Enable (FSEN)<br>1: FIFO Status interrupt will be asserted when either single read or single write operation condition is met for the FIFO Channel Buffer n.<br>0: FIFO Status interrupt is disabled.<br>FSEN flag only works in Slave DMA mode. So in other modes, FSEN should be disabled.<br>Bit 11: Terminal Count Interrupt Enable (TCEN)<br>1: Terminal Count Interrupt will be asserted when DMA data transfer between an external memory location and a FIFO Channel Buffer n is completed<br>0: Terminal Count Interrupt is disabled.<br>Terminal Count interrupt only works in Master DMA mode where DR bit equals to 0 or in continuous data transfer mode. So in other modes, TCEN should be disabled. |
| 10 | DBEN | 0 | R/W | Double Buffer Enable (DBEN)<br>This flag sets the data transfer mode to be either continuous or fixed length and can apply to all DMA modes except external DMA mode.<br>1: Continuous data transfer mode<br>0: Fixed length data transfer mode<br>For master DMA mode, DBEN requires double buffer in external memory for continuous data transfer but for other DMA modes, DBEN means continuous data transfer and does not requires double buffer. In continuous data transfer mode, DMA Length specified in the appropriate DMA length register does not specify the actual data transfer length.<br>In continuous data transfer mode, direct memory access controller 12 does not count data transferred. So continuous data transfer mode can be used only when the conditions below are met,<br>In master DMA, slave DMA mode, destination subsystem on the register bus 21 must support both a DMA counter and a data transfer completion interrupt. Data counting should be done both in the subsystem on the register bus 21 and in software.<br>In inter-subsystem DMA mode, destination subsystem on the register bus 21 must support DMA stop function. Whether data counting and data transfer completion interrupt are necessary or not depend on device use case.<br>Master DMA mode<br>In continuous data transfer mode, data is transferred continuously between external memory and a subsystem on the register bus 21. The direct memory access controller 12 will continuously cycle between two buffers in the external memory which is arranged as a contiguous external memory block, Terminal Count event occurs at the end of each buffer transfer and then switch automatically to the other buffer. The start address and buffer length are set in the DMA Start Address and DMA length registers respectively. The central processing unit 2 must write to or read from the data buffer that is not being accessed. Both buffers will have the same length, buffer 1 is at address (appropriate DMA start address) |

-continued

| Bit | Bit Name | Initial Value | R/W | Description |
|---|---|---|---|---|
| | | | | and buffer 2 is at (appropriate DMA start address + appropriate DMA length).<br>DMA length should be larger than FIFO Channel Buffer size.<br>In fixed length data transfer mode, the Terminal Count event occurs when the DMA address counter reaches the end of the buffer and the transfer will then stop.<br>Slave DMA mode<br>In continuous data transfer mode, data transfer between a FIFO 61 and a subsystem on the register bus 21 is continuous. Clearing DBEN flags will terminate the data transfer after DMA length register of register the number of bytes given by have been transferred.<br>In fixed length data transfer mode, DMA n Length will be transferred.<br>Inter-subsystem DMA mode<br>In continuous data transfer mode, data transfer will be continuously conducted between two subsystems on the register bus 21. Clearing DBEN flags will terminate the data transfer after the number of bytes, indicated by the appropriate DMA length register, have been transferred.<br>In fixed length data transfer mode, the number of bytes given by the DMA length register will be transferred.<br>This data transfer only succeeds when the source subsystem on the register bus 21 can wait until the FIFO space is available because direct memory access controller 12 will not respond to DMA requests from the source subsystem on the register bus 21 when the FIFO 61 is full. Also, the destination subsystem on the register bus 21 should be able to wait until the FIFO 61 is not empty.<br>Any kind of flow control scheme between source and destination subsystems on the register bus 21 is conducted outside direct memory access controller 12.<br>External DMA mode<br>Data transfer mode is not relevant. DBEN flag should be 0. |
| 9 | ML | 0 | R/W | External Memory Location (ML)<br>In master DMA mode, this flag specifies where the external memory connected. This flag is ignored in other DMA modes.<br>1: System Memory connected to PCI/MPX Bus 8, 9<br>0: Graphics Memory connected to the memory interface 13 via the pixel bus 20. |
| 8 | RBEN | 0 | R/W | Register Bus Enable (RBEN)<br>If this flag is set to 1, then the data transfer will be in inter-subsystem DMA mode for the corresponding DMA channel..<br>1: Specifies the inter-subsystem DMA mode, i.e. between subsystems on the register bus 21<br>0: Specifies that the DMA will be between a subsystem on the register bus 21 and external memory<br>The RBEN flag is 0 in modes other than inter-subsystem DMA mode. Endian conversion is not supported in inter-subsystem DMA mode.<br>If RBEN flag is set to 1, RTRA flag should be set to 1 also. |

-continued

| Bit | Bit Name | Initial Value | R/W | Description |
|---|---|---|---|---|
| 7 | MM | 0 | R/W | Master Mode (MM)<br>Each channel in the direct memory access controller 12 can be configured for either master or slave DMA mode in terms of PCI/MPX bus operation. In Master DMA mode, the direct memory access controller 12 controls the flow of data between a FIFO 61 and external memory. In Slave DMA mode, a FIFO 61 is directly accessible by either the central processing unit 2 or by a device on the PCI Bus 9, if used. In slave DMA mode, the external device is responsible for controlling the data transfer and the channel start address register value is ignored.<br>1: DMA channel is in master DMA mode.<br>0: DMA channel is not in master DMA mode<br>The MM flag is 0 in inter-subsystem DMA mode and external DMA mode. |
| 6 | DTRA | 0 | R/W | Start Master DMA Transfer (DTRA)<br>In master DMA mode, when this flag is set to 1, direct memory access controller 12 initiates the DMA data transfer from a FIFO 61 to external memory.<br>Master DMA can operate in both data transfer modes specified by DBEN flag.<br>Fixed length data transfer (DBEN=0)<br>Writing a '1' to the DTRA flag starts the master DMA transfer. This flag will automatically be cleared to 0 at the end of the transfer when the specified DMA transfer is completed. Clearing this flag will stop the data transfer. If a DMA length of 0 is specified, this flag is cleared to 0 without DMA transfer.<br>1: Start master DMA Transfer between a FIFO 61 and external memory<br>0: Stop data transfer and reset address counters (not necessary in normal DMA completion)<br>Continuous data transfer (DBEN=1)<br>Writing a '1' to DTRA flag starts the master DMA transfer, the transfer will be continuous until DTRA flag is cleared to 0 by the central processing unit 2. Data transfer will then stop at the end of the buffer that it is currently transferring and address counters set to their initial state. In order to stop continuous data transfer, then the DMA stop operation should be conducted.<br>1: Start master DMA Transfer between a FIFO 61 and external memory<br>0: Stop data transfer at end of current buffer and reset address counters.<br>In either slave DMA or inter-subsystem DMA or external DMA mode, DTRA flag is 0. |
| 5 | DR | 0 | R/W | Direction (DR)<br>Direction flag specifies the data transfer direction between the Primary DMA Address specified in the CSEL and the Secondary DMA Address specified in appropriate DMA start address register. |
| 4 | RTRA | 0 | R/W | Start Register Bus Transfer (RTRA)<br>Writing a '1' to this flag initiates the DMA data transfer on the register bus 21. In fixed length data transfer mode, RTRA flag will be cleared to 0 when data transfer completed. In continuous data transfer mode, RTRA flag will not be cleared to 0 by direct memory access controller 12. If RTRA is cleared to 0 during a DMA then the transfer will stop. If DMA is stopped midway through a transfer then there could be data left in the FIFO 61. The RTRA flag controls the transfer of data across the register bus 21. In the case of data being transferred from a subsystem on the register bus 21, the transfer will start as soon as this flag is set to 1 and will continue until the FIFO 61 is full. In the case of data transfer to a subsystem on the register bus 21 then this will only happen if this flag is set to 1 and there is data in the FIFO Channel Buffer.<br>1: Start register bus DMA transfer<br>0: Stop data transfer and reset address counters (not necessary in normal DMA completion) |
| 3, 2 | CWD | 0 | R/W | Bits 3, 2: Channel Width Destination (CWD) |
| 1, 0 | CWS | 0 | R/W | Bits 1, 0: Channel Width Source (CWS)<br>CWS specifies the data width in the source DMA address and CWD specifies the data width in the destination DMA address except for Inter-subsystem DMA mode.<br>00: 32 bits<br>01: 16 bits<br>11: 8 bits<br>CWD is only valid if destination address is primary DMA address and CWS is only valid if source address is primary DMA address. If CWD or CWS is invalid, then value should be 00.<br>If CWD is valid, ENDS is valid and CWS/ENDD are invalid. If CWS is valid, ENDD is valid and CWD/ENDS are invalid. In Inter-subsystem DMA mode, all CWD/CWS/DNDD/ENDS are invalid. These fields in conjunction with the ENDS/ENDD flags control the transfer of data to and from external memory and Subsystem on the register bus 21, which are not 32-bit wide when data packing and unpacking is required. To accomplish data packing and unpacking the Endian of the data and subsystem on the register bus 21 size is needed so that data alignment and order is correct across the data transfer.<br>All DMA transfers are longword (32-bit wide), however, when transferring data to or from a subsystem on the register bus 21 that is not 32-bit wide, the data can be packed in external memory, these flags indicate the data width of a given subsystem on the register bus 21.<br>Data packing or unpacking can be performed by the direct memory access controller 12, if the data size on the Subsystem on the register bus 21 is set to 16 bits or 8 bits. The external memory will always be 32 bits.<br>In the case of an 8-bit Subsystem on the register bus 21 data transferred to 32-bit external memory, CWS = 11 and CWD = 00. Depending on the destination Endian, in this case external memory, each byte will be written to its correct position in the appropriate FIFO 61, the data is then transferred to external memory in the correct format. |

-continued

| Bit | Bit Name | Initial Value | R/W | Description |
|---|---|---|---|---|
| | | | | In the case of an 8-bit subsystem on the register bus 21 data received from 32-bit external memory, CWS = 00 and CWD = 11. Each longword will be written to the FIFO 61 and depending on the source Endian, in this case external memory, the data will then be transferred a byte at time from the correct position in the FIFO 61 to the subsystem on the register bus 21. When unpacked data is being written to or read from subsystems on the register bus 21, the data is aligned to the least significant word or byte. The ENDS/ENDD flags of this register set the Endian of the data in the source and destination DMA addresses. Peripherals that do not have 32-bit registers will perform byte swapping if necessary. The CWS and CWD flags control data packing unpacking, so if this function is not required even though the subsystem on the register bus 21 data width is not 32 bits then these flags should be set to 32 bits. Endian conversion is not supported for data transfer in inter-subsystem DMA mode. In this case Subsystem on the register bus 21s that are connected together must be matched in both Endian and data size. The size flags must be set to 1 to 32 bits to indicate that the transfers are treated as 32-bit wide, however in this case not all the bits will be valid. |

DMA RAM Buffer Size Registers

| Bit | Bit Name | Initial Value | R/W | Description |
|---|---|---|---|---|
| 31 to 12 | — | 0 | R | Not used. |
| 11 to 4 | Start | 0 | R/W | Specifies the start address offset of the FIFO channel buffer within the RAM in 4 longwords. |
| 3 to 0 | Length | 0 | R/W | Specifies the length of the FIFO channel buffer within the RAM 4 longwords. Buffer length can be either 16, 32 or 64 longwords. |

The DMA count registers block 85 comprises a subsystem count register (PCOUNT) and an external memory count register (MCOUNT) for each DMA channel. The PCOUNT registers store the number of bytes of a DMA transfer between a subsystem on the register bus 21 and the corresponding FIFO 61 that have been transferred. The MCOUNT registers store the number of bytes of a DMA transfer between the corresponding FIFO 61 and an external memory 3, 7 that have been transferred.

Finally, the FIFO block 86 comprises a 4-byte word corresponding to a respective one of the FIFOs 61. Writing to one of these addresses adds data to the end of the corresponding FIFO 61 and reading from one of these addresses obtains the data at the head of the corresponding FIFO 61.

Referring again to FIG. 3, the register bus interface 64 has a plurality of DMA request lines 50 leading into it. These request lines 50 are connected to DMA request ports of the subsystems on the register bus 21. The DMA request numbers, associated with these lines 50, are predetermined and fixed. In the present example, these are:

| Subsystem | Register Name of Address Programmed into DMA request_address register | DMA Request Shared between Subsystems | DMA Request Number |
|---|---|---|---|
| OS8104 i/f Packet Tx (36) | MIM_PacketTx | Yes | 0 |
| Expansion Bus 0 (36) | Expansion Port 0 | Yes | 0 |
| OS8104 i/f Rx (36) | MIM_PacketRx | Yes | 1 |
| Expansion Bus 1 (36) | Expansion Port 1 | Yes | 1 |
| OS8104 i/f Stream 1 (36) | MIM_Stream1 | No | 2 |
| OS8104 i/f Stream 2 (36) | MIM_Stream2 | No | 3 |
| OS8104 i/f Stream 3 (36) | MIM_Stream3 | No | 4 |
| OS8104 i/f Stream 4 (36) | MIM_Stream4 | No | 5 |
| SSI0 (serial sound interface 0) (41) | Transmit Data Register 0/ Receive Data Register 0 | No | 6 |
| SSI1 (38) | Transmit Data Register 1/ Receive Data Register 1 | No | 7 |
| SSI2 (38 or 51) | Transmit Data Register 2/ Receive Data Register 2 | Yes | 8 |
| CD-ROM Block Decoder (51) | Output_data Register | Yes | 8 |
| SSI3 (42) | Transmit Data Register 3/ Receive Data Register 3 | No | 9 |
| SPDIF Tx (49) | Transmitter DMA Audio Data | No | 10 |
| SPDIF Rx (49) | Receiver DMA Audio Data | No | 11 |
| HSPI0 Tx (31) | Transmit Buffer Register 0 | Yes | 12 |
| AV-Link (31) | AV Data Register | Yes | 12 |
| HSPI0 Rx (31) | Receive Buffer Register 0 | No | 13 |
| HSPI1 Tx (31 or 34) | Transmit Buffer Register 1 | No | 14 |
| HSPI1 Rx (31 or 34) | Receive Buffer Register 1 | No | 15 |
| CSC 0 (35) | Indata | No | 16 |
| CSC 1 (35) | Outdata | No | 17 |
| AC97 Tx (43) | TX DMA Register | No | 18 |
| AC97 Rx (43) | RX DMA Register | No | 19 |
| UART0 Tx (40) | Transmit Data Register 0 | No | 20 |
| UART0 Rx (40) | Receive Data Register 0 | No | 21 |
| UART1 Tx (41 or 43) | Transmit Data Register 1 | No | 22 |
| UART1_Rx (41 or 43) | Receive Data Register 1 | No | 23 |
| UART2 Tx (42 or 43) | Transmit Data Register 2 | No | 24 |
| UART2 Rx (42 or 43) | Receive Data Register 2 | No | 25 |
| UART3 Tx (39) | Transmit Data Register 3 | Yes | 26 |
| HSPI2 Tx (39) | Transmit Buffer Register 2 | Yes | 26 |
| UART3 Rx (39) | Receive Data Register 3 | Yes | 27 |
| HSPI2 Rx (39) | Receive Buffer Register 2 | Yes | 27 |
| ATAPI (17) | Data Register | No | 28 |
| USB Function 1 (48) | EP1 data register | No | 29 |
| USB Function 2 (48) | EP2 data register | No | 30 |

The control registers 68 include the DMA subsystem request address registers, which map DMA request lines 70 onto subsystem register addresses, the DMA external select register, the DMA status register, the DMA FIFO status register, a FIFO burst status register, the DMA interrupt source register, the DMA FIFO flush register, the DMA subsystem request status register and the PIO monitor register.

The DMA external select register is included in the control registers 68. This register is organised as follows:

| Bit | Bit Name | Initial Value | R/W | Description |
|---|---|---|---|---|
| 31 to 7 | — | 0 | R | Not used |
| 6 | MEND | 0 | R/W | If the external bus is an MPX bus 9, this flag sets the Endian of central processing unit 2 PIO accesses into the address space of the direct memory access controller 12.<br>1: Big Endian<br>0: Little Endian |
| 5 | DDEN | 0 | R/W | If this flag is set to 1, then the next access to a subsystem on the register bus will look to the system the same as a DMA cycle. There are some subsystems which make spurious DMA request and have no mechanism for clear their own DMA request. This flag must be reset to 0 after the access to the subsystem.<br>1: PIO access programmed for dummy DMA cycle<br>0: PIO access does not use dummy DMA cycle |
| 4 | EDMA | 0 | R/W | If this flag is set to 1, then external DMA will start to transfer data to or from the FIFO channel buffer specified in EDMS field. If this flag is cleared to 0, then the DMA transfer will stop.<br>The system supports only one external DMA channel when the external bus is an MPX bus 9. The external DMA channel can be allocated to any of one the 16 DMA channels during initialisation of the direct memory access controller 12. If the EDMA flag is set to 1 then the DMA channel addressed by EDMS field will be configured as for a normal DMA transfer. The FIFO channel buffer status flags are routed to the extetnal DMA controller as a DMA request. In this way, the central processing unit 2 conducts flow control to FIFO DMA channel.<br>1: Start External DMA data transfer<br>0: Stop External DMA data transfer |
| 3 to 0 | EDMS | 0 | R/W | Specifies the DMA channel that has been selected for external DMA. |

The DMA status register comprises a subsystem terminal count status (PT) flag for each DMA channel and a terminal count status (TC) flag for each DMA channel. The PT flags specify the subsystem terminal count status of the respective DMA channels. These flags are set when DMA transfers to and from a subsystem to the appropriate FIFO 61 are completed. There is an option for an interrupt to be generated when these flags are set. The TC flags are set when DMA transfers from a corresponding FIFO 61 and external memory are completed.

The DMA FIFO status register is only used in slave mode and indicates by flags whether individual FIFOs 61 are available for single reading and writing or burst reading and writing. The direct memory access controller 12 can be configured to generate interrupts when these flags are set.

The FIFO burst status register indicates whether individual FIFOs 61 are available for burst reading and writing operations, i.e. interactions via the pixel bus 20 or the external bus 8, 9.

The DMA interrupt source register comprises a set of channel interrupt mask flags, one for each DMA channel, and channel interrupt masks. The channel interrupt flags indicate the interrupt statuses of the DMA channels. The flags are each the result of ORing all of the interrupts pertinent to that channel and are set when an interrupt becomes pending. When the interrupt has been handled, the corresponding flag is reset. The channel interrupt mask has a bit for each DMA channel and the states of its bits determine whether an interrupt pertaining to a particular DMA channel is asserted to the central processing unit 2.

The DMA FIFO flush register comprises a flag for each FIFO 61. Setting one of these flags causes the corresponding FIFO 61 to be flushed and the data discarded.

The DMA subsystem request status register indicates pending DMA requests from the subsystems. When a subsystem makes a DMA request, the corresponding flag in the DMA subsystem request status register is set. This register sets the order in which DMA request from subsystems are handled.

The PIO monitor register is provided as part of a scheme to control access to the register bus 21 by the central processing unit 2 so as to prevent interference with efficient DMA operation. Under this scheme, central processing unit access to the register bus 21 is given the top priority. However, as the demand for register bus access from the central processing unit 2 exceeds a certain level, this high priority is overridden.

The bits of the programmable IO monitor register are divided among a threshold count, an up count, an enable flag and a monitor count. The threshold count establishes a limit for PIO usage of the register bus 21 that can occur before action is taken to hold off such accesses. This is necessary because, under normal circumstances, these accesses have the highest priority for bus arbitration and can potentially exclude the subsystems from the register bus 21 for undesirably long periods. The count is provided in by the monitor count value which is incremented by the up count value for each system bus clock cycle during programmable IO operation by the central processing unit 2. The count is decremented by one for each system bus clock cycle outside of PIO accesses.

The up count value is set in dependence on the basis of the operational conditions experienced in a particular application.

The enable flag is set when the monitor count is value is 0 and reset when the monitor count exceeds the threshold count.

The operation of the system interface 62 of the direct memory access controller 12 for burst operation will now be described.

The active DMA channels are determined to produce a mask identifying the DMA channels that should be subject to a round robin priority algorithm. A channel is active if the number of DMA transfers that are to be completed is greater than the burst size and there is a burst size of data in the channel's FIFO or a burst size of space in the FIFO, depending on the direct of transfer. If the number of DMA transfers is less than the burst size, the channel is active if the number of words left to transfer is equal to the space in the FIFO or words available in the FIFO, depending on the direction of data transfer. The number of words left is the difference between the MCOUNT register's value and the transfer length in the corresponding DMA length register. The channels that are active are passed as a mask value to the round robin algorithm, which selects the next active channel, and a burst is sent to or received from the external bus 8, 9.

In the present embodiment, the burst size used by the system interface 62 is fixed at 8. However, this may differ in other embodiments.

The operation of the system interface 62 of the direct memory access controller 12 for slave mode will now be described.

In slave DMA mode, the central processing unit 2 conducts DMA operation using a DMA channel of the direct memory access controller 12 and transfers data between a subsystem on the register bus 21 and system RAM 3. The system interface 62 indicates to the central processing unit 2 that there is a burst-sized space or a burst's worth of data in the FIFO by sending an interrupt signal or by setting a flag that is polled by the central processing unit 2. In the case of a transfer from a subsystem on the register bus 21, the central processing unit 2 places the FIFO address, in block 86 (FIG. 5), on the external bus and the system interface 62 reads the contents of the FIFO thus addressed and places them sequentially on the external bus 8, 9. In the case of a transfer to a subsystem on the register bus 21, the central processing unit 2 places the FIFO address, in block 86 (FIG. 5), on the system bus, followed by the burst of data. The system interface 62 receives the burst of data and writes it to the received FIFO address. All of the data is written to the same address but is written into separate physical locations in the RAM.

The operation of the system interface 62 of the direct memory access controller 12 for external DMA mode with the external bus being an MPX bus 9 will now be described.

In external DMA mode, the direct memory access controller of the central processing unit 2 conducts DMA operation using a DMA channel of the direct memory access controller 12 and transfers data between a subsystem on the register bus 21 and system RAM 3. The system interface 62 indicates to the external DMA controller that there is a burst-sized space or a burst's worth of data in the FIFO by asserting an MPX DMA request signal to the external DMA controller. This signal is acknowledged and is then deasserted. The external DMA controller then sends the address of the appropriate FIFO 61 and then transfers a burst of data to or from system interface 62 using the MPX DMA request acknowledge signal to show that it is a DMA transfer. The system interface 62 handles the reading and writing of data in the RAM on the basis of the received FIFO address. When the transfer is completed, if another transfer is possible, the system interface 62 will again assert the MPX DMA request signal.

The operation of the pixel bus interface 63 of the direct memory access controller 12 for burst accesses will now be described.

The active DMA channels ate determined to produce a mask identifying the DMA channels that should be subject to a round robin priority algorithm. A channel is active if the number of DMA transfers that are to be completed are greater than the minimum burst size and there is a minimum burst size worth of data in its FIFO 61 or a minimum burst size worth of space in its FIFO 61, depending on the direction of data transfer. If the number of DMA transfers is less that the minimum burst size, the channel is active if the number of words left to transfer is equal to the space in the FIFO 61 or words available in the FIFO 61, depending on the direction of data transfer. The number of words left is the difference between the MCOUNT register's value and the transfer length in the corresponding DMA length register. The channels that are active are passed as a mask value to the round robin algorithm which selects the next active channel, and a burst is sent or received via the pixel bus 20 for the selected channel.

In the present example, the minimum burst size is 4 and the maximum burst size is 8. However, different values can be used in other embodiments.

Figure 6:
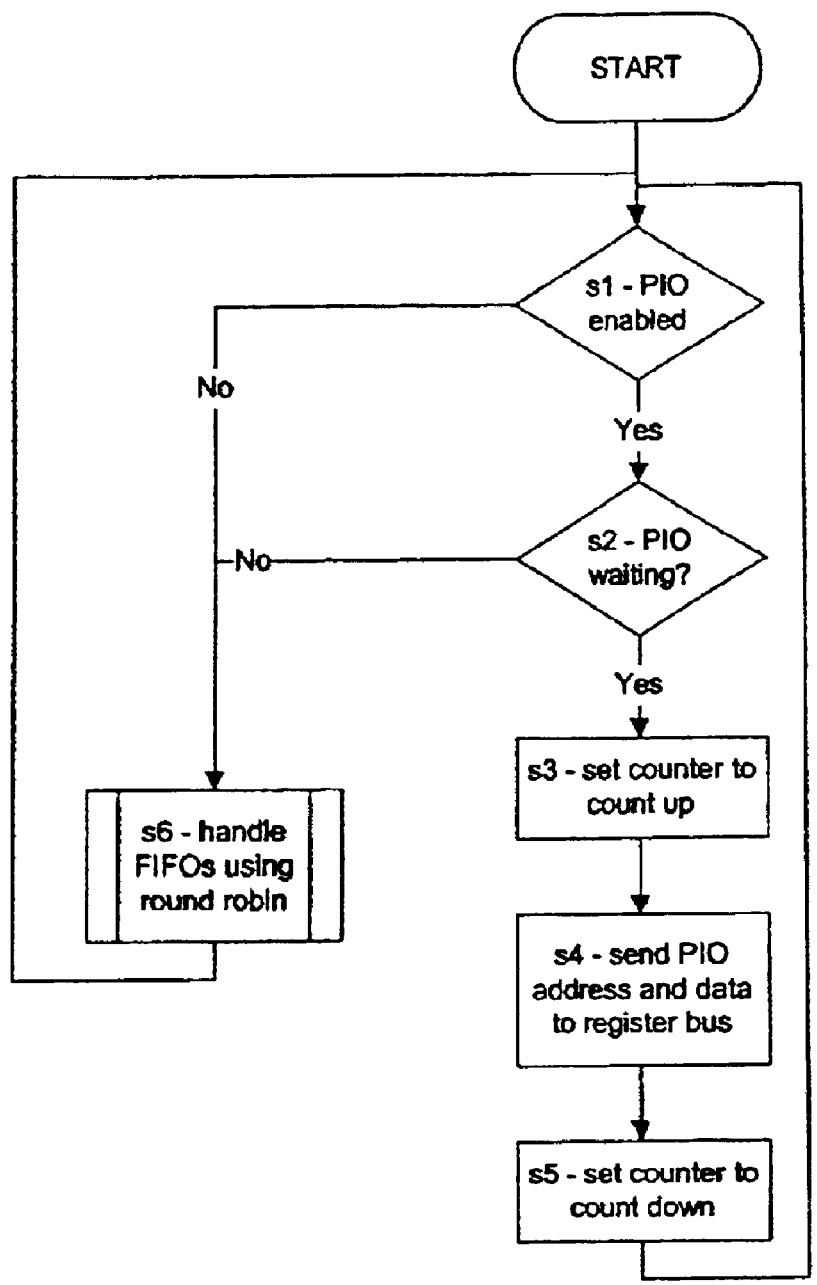
FIG. 6 is a flowchart illustrating the operation of the register bus interface of the direct memory access controller of FIG. 4.

The operation of the register bus interface 64 of the direct memory access controller 12, with PIO monitoring enabled, will now be described with reference to FIG. 6.

First, if programmed IO access to the register bus 21 is not blocked by the PIO monitor (step s1) as indicated by the enable flag in the PIO monitor register, it is determined whether there are any pending PIO operations (step s2). If a PIO operation is pending, the PIO monitor counter is set to count up (step s3) and the PIO operation is handled by placing the address on the register bus 21 (step s4). In write mode, the register bus interface 64 places the data from the remote device on the register bus 20. However, in read mode, the register bus interface 64 reads the data from the addressed register and passes it to the PIO bypass channel 40 for transfer to the external bus 8, 9. The PIO monitor counter is then is set to count down (step s5).

If programmed IO access is not enabled (step s1) or there are no pending programmed IO operations (step s2), the DMA transfers to the register bus 21 via the FIFOs 61 are handled using a round robin algorithm.

The handling of programmed IO accesses to subsystems on the register bus 21 by the central processing unit 2 will now be described.

In order to write to a register of a subsystem on the register bus 21, the central processing unit 2 places the address of the register on the system bus 8. The address is then transferred to the PCI/MPX interface 11. The PCI/MPX interface 11 detects that the address is not in the UMA SDRAM 7 and directs it to the system interface 32 of direct memory access controller 12. The system interface 32 of the direct memory access controller 12 determines that the address is of a register of a subsystem on the register bus 21 and consequently passes it to the PIO bypass channel 40 where it is buffered.

The register bus interface 64 detects that a PIO operation is pending in the PIO bypass channel 40 and, in accordance with the register bus arbitration scheme the address data latched in the PIO bypass channel 40 is placed on the register bus 21 followed by the data. Consequently, the data is loaded into the appropriate register of a subsystem on the register bus 21.

DMA transfers in the foregoing are accompanied by signals indicating that a DMA transfer, rather than a single transfer mode data transfer, is taking place.

Figure 7:
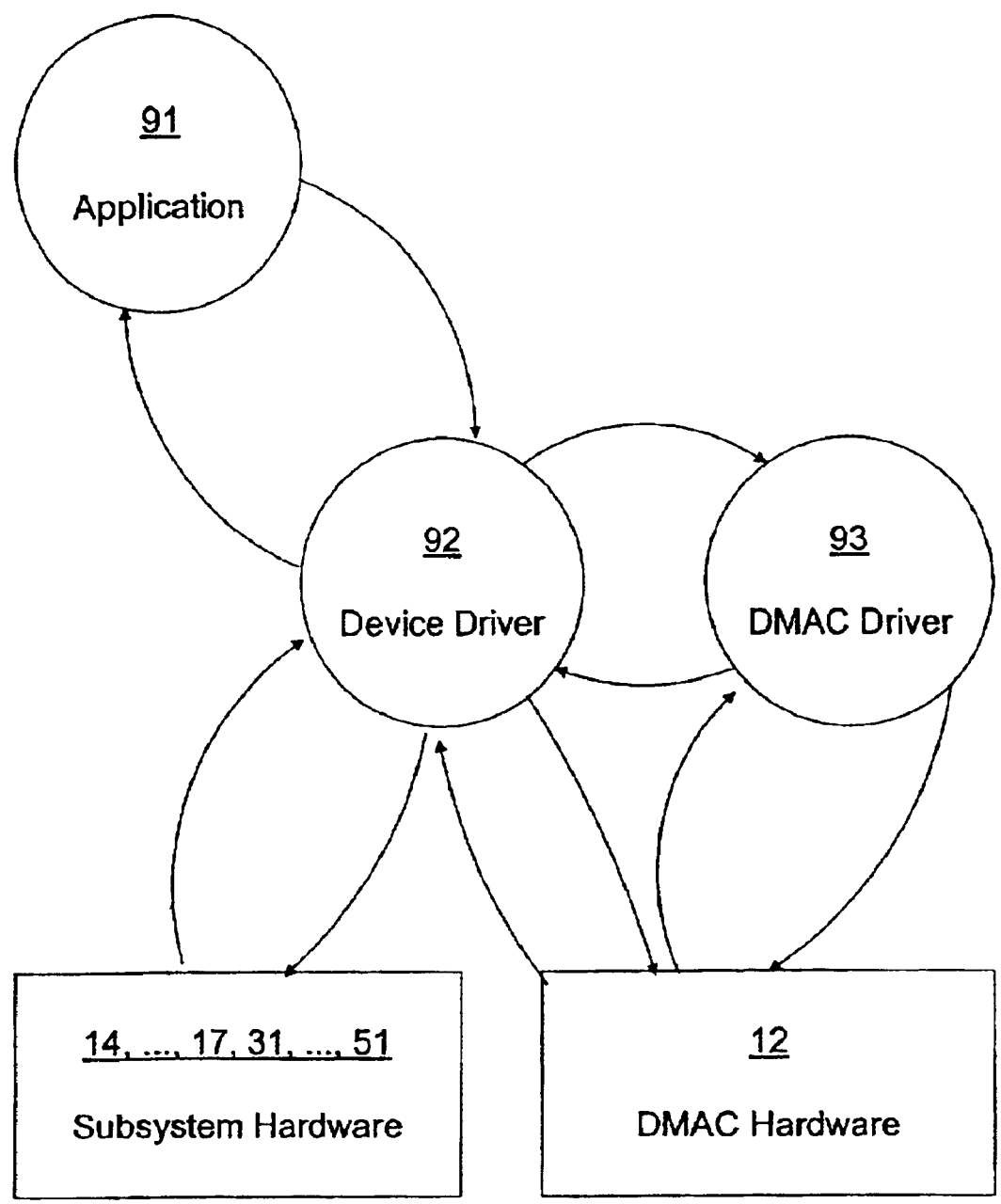
FIG. 7 is a data flow diagram illustrating the operation of a computer system according to the present invention.

Referring to FIG. 7, in the software domain, it is preferred that an application 91 interact with the direct memory access controller 12 and the subsystems on the register bus 21 by means of a device driver 92 and a device direct memory access controller 93 for the subsystem in question. The ownership of the control registers 68 in the direct memory access controller 12 is shared between the direct memory access controller driver 93, the device driver 92 and the system interrupt handler. More particularly, the direct memory access controller driver 93 owns the registers indicating the sizes and locations of the FIFOs 61 and the DMA request address registers. The device driver 92 owns the registers containing the DMA transfer start address in external memory, the burst size and transfer length in bursts, the control value specifying the DMA mode, the primary DMA address and transfer direction, whether data packing or unpacking is required, whether endian conversion is required, the data transfer mode, i.e. continuous or fixed length, which interrupts and buffer statuses should be reported and whether a transfer should be started, the registers in the FIFO block 82, the DMA FIFO flush register, the DMA subsystem request status register. The system interrupt handler owns the DMA interrupt source and DMA FIFO status registers.

Figure 8:
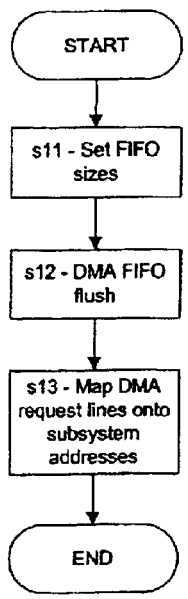
FIG. 8 is a flowchart illustrating an initialization routine for the direct memory access controller of FIG. 4.

Referring to FIG. 8, when the system is initialized, an initialization routine of the direct memory access controller driver 93 is called. This routine first sets the initial sizes of the FIFOs 61 (step s11). The FIFOs are then flushed by writing 1 to each bit of the DMA FIFO flush register corresponding to a DMA channel (step s12). Finally, the DMA request address registers are set to the addresses of the corresponding subsystem on the register bus 21 (step s13).

Scenario 1—Master Mode

The transfer of data by DMA from a UART on the register bus 21 to system RAM 3 using a PCI bus 9 in fixed length data transfer mode will now be described. The UART uses DMA request number 20 which is mapped onto DMA channel 2 in this example.

Figure 9:
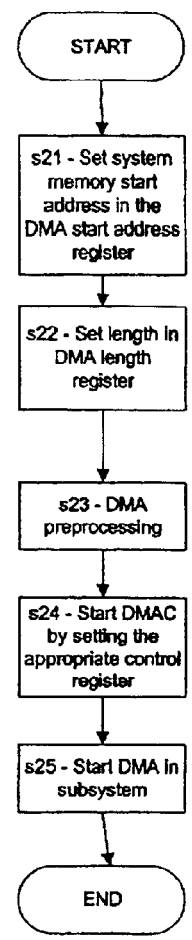
FIGS. 9 and 10 are flowcharts illustrating a first operational mode of the direct memory access controller of FIG. 4.

Referring to FIG. 9, the device driver 92 for the UART starts by writing the destination start address into the start address register for DMA channel 2, (step s21). Then the device driver 92 writes the byte count into the length register for DMA channel 2 (step s22). After the DMA channel has been set up, the device driver 92 calls a standard DMA pre-processing routine (described below) (step s23). The DMA transfer can now begin.

The device driver 92 writes a control value into the control register for DMA channel 2 (step s24). This control value comprises:

| | |
|---|---|
| CSEL | 10100 |
| ENDD | 0 |
| ENDS | 0 |
| PTEN | 0 |
| FBEN | 0 |
| FSEN | 0 |
| TCEN | 1 |
| DBEN | 0 |
| ML | 1 |
| RBEN | 0 |
| MM | 1 |
| DTRA | 1 |
| DR | 0 |
| RTRA | 1 |
| CWD | 00 |
| CWS | 01 |

The direct memory access controller 12 is now configured. The DMA process is started in the UART by the device driver 92 writing to a control register of the UART using programmable IO (step s25). This causes the UART to request DMA by signalling on DMA request line no. 20.

The direct memory access controller 12 begins to read data, a 2 bytes at a time, from the UART. The data read from the UART is written to the tail of the appropriate FIFO 61.

The data in the FIFO 61 allocated to DMA channel 2 is output in bursts to system RAM 3 by the system interface 62 as described above.

Figure 10:
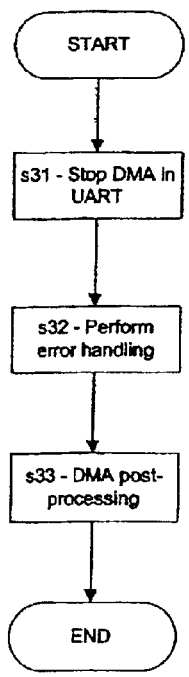

Referring to FIG. 10, on an interrupt, generated by the TC flag being set or a time out, an interrupt handler terminates the DMA process in the UART by writing the appropriate control data to it (step s31) and perform any error handling associated with the UART (step s32). A standard DMA post-processing routine (step s33) (described below).

Scenario 2—Master Mode

If a subsystem on the register bus has its own DMA counter and completion interrupt, in this example a sound serial interface, continuous data transfer mode can be used. The sound serial interface uses DMA request number 7 which is mapped onto DMA channel 5 in this example and the external bus is a PCI bus 9.

Figure 11:
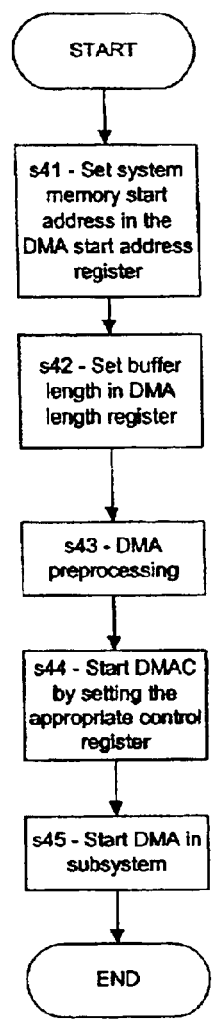
FIGS. 11, 12 and 13 are flowcharts illustrating a second operational mode of the direct memory access controller of FIG. 4.

Referring to FIG. 11, a transfer in this mode is initiated by the relevant device driver 92 writing the destination start address into the start address register for DMA channel 5 (step s41). Then the device driver 92 writes the buffer length into the length register for DMA channel (step s42). After the DMA channel has been set up, the device driver 52 calls the standard DMA pre-processing routine (step s43). The DMA transfer can now begin.

The device driver 52 writes a control value into the control register for the DMA channel (step s44). This control value comprises:

| | |
|---|---|
| CSEL | 00111 |
| ENDD | 0 |
| ENDS | 0 |
| PTEN | 0 |
| FBEN | 0 |
| FSEN | 0 |
| TCEN | 1 |
| DBEN | 1 |
| ML | 1 |
| RBEN | 0 |
| MM | 1 |
| DTRA | 1 |
| DR | 0 |
| RTRA | 1 |
| CWD | 00 |
| CWS | 00 |

The direct memory access controller 12 is now configured. The DMA process is started in the subsystem by the device driver 92 writing to a control register of the sound serial interface using programmable IO (step s45). This causes the sound serial interface to request DMA by signalling on its DMA request line. After starting the DMA processing in the sound serial interface.

The direct memory access controller 12 starts reading data from the sound serial interface.

The data in the FIFO allocated to DMA channel 5 is output in bursts to system RAM 3 by the system interface 62 as described above.

Figure 12:
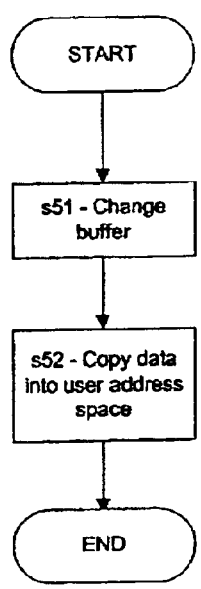

Referring to FIG. 12, on an interrupt generated by the TC flag being set, the buffer being used at the system RAM 3 must the changed (step s51) and the data in the full buffer copied into user address space (step s52).

Figure 13:
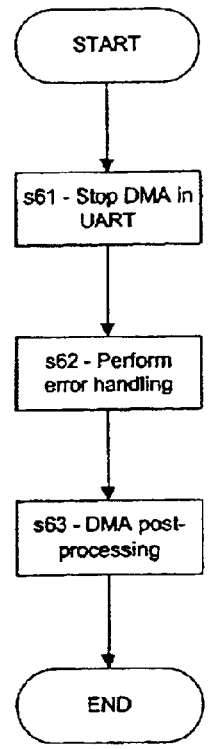

Referring to FIG. 13, on an interrupt, generated by the sound serial interface to mark the end of data transfer or a time out, an interrupt handler terminates the DMA process in the sound serial interface by writing the appropriate control data to it (step s61) and perform any error handling associated with the sound serial interface (step s62). The standard DMA post-processing routine (step s63) is then performed.

Scenario 3—Master Mode

The transfer of data by DMA from the aforementioned UART on the register bus 21 to the UMA SDRAM 7 in fixed length data transfer mode will now be described.

Figure 14:
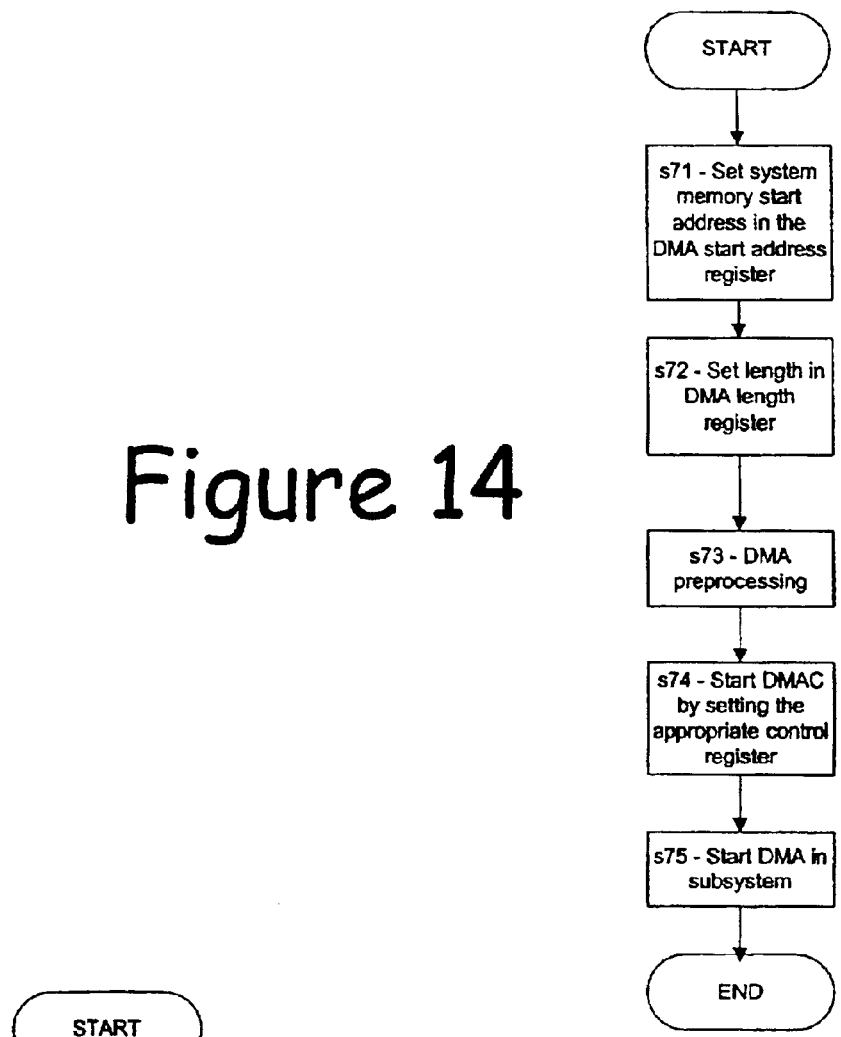
FIGS. 14 and 15 illustrate a third operational mode of the direct memory access controlling of FIG. 4.

Referring to FIG. 14, the device driver 92 for the UART starts by writing the destination start address into the start address register for DMA channel 2, which is the UART's transmit channel (step s71). Then the device driver 92 writes the byte count into the length register for DMA channel 2 (step s72). After the DMA channel has been set up, the device driver 92 calls the standard DMA pre-processing routine (step s73). The DMA transfer can now begin.

The device driver 92 writes a control value into the control register for DMA channel 2 (step s74). This control value comprises:

| | |
|---|---|
| CSEL | 10101 |
| ENDD | 0 |
| ENDS | 0 |
| PTEN | 0 |
| FBEN | 0 |
| FSEN | 0 |
| TCEN | 1 |
| DBEN | 0 |
| ML | 0 |
| RBEN | 0 |
| MM | 1 |
| DTRA | 1 |
| DR | 0 |
| RTRA | 1 |
| CWD | 00 |
| CWS | 01 |

The direct memory access controller 12 is now configured. The DMA process is started in the UART by the device driver 92 writing to a control register of the UART using programmable IO (step s75). This causes the UART to request DMA.

The direct memory access controller 12 begins to read data from the UART as described above. The data in the FIFO allocated to DMA channel 2 is output in bursts to UMA SDRAM 7 by the pixel bus interface 63 as described above.

Figure 15:
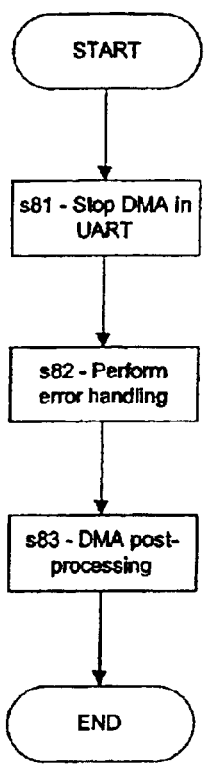

Referring to FIG. 15, on an interrupt, generated by the TC flag being set or a time out, an interrupt handler terminates the DMA process in the UART by writing the appropriate control data to it (step s81) and perform any error handling associated with the UART (step s82). The standard DMA post-processing routine (step s83) is then performed.

Scenario 4—Master Mode

If a subsystem on the register bus has its own DMA counter and completion interrupt, in this example the ATAPI interface 17, continuous data transfer mode can be used. In this example, DMA channel 5 is used.

Figure 16:
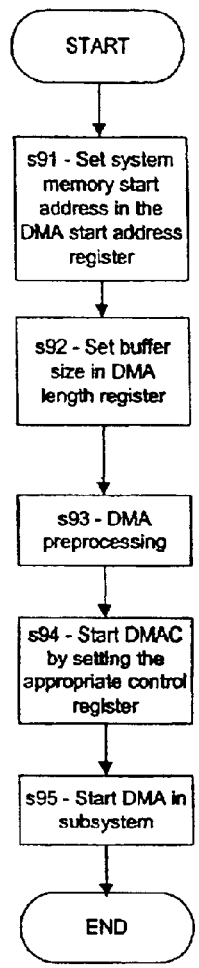
FIGS. 16, 17, 18 illustrate a fourth operational mode of the direct memory access controller of FIG. 4.

Referring to FIG. 16, a transfer in this mode is initiated by the relevant device driver 92 writing the destination start address into the start address register for DMA channel 5 (step s91). Then the device driver 92 writes buffer size into the length register for DMA channel 5 (step s92). After the DMA channel has been set up, the device driver 92 calls the standard DMA pre-processing routine (step s93). The DMA transfer can now begin.

The device driver 92 writes a control value into the control register for the DMA channel (step s94). This control value comprises:

| | |
|---|---|
| CSEL | 11100 |
| ENDD | 0 |
| ENDS | 0 |
| PTEN | 0 |
| FBEN | 0 |
| FSEN | 0 |

-continued

| | |
|---|---|
| TCEN | 1 |
| DBEN | 1 |
| ML | 1 |
| RBEN | 0 |
| MM | 1 |
| DTRA | 1 |
| DR | 0 |
| RTRA | 1 |
| CWD | 00 |
| CWS | 00 |

The direct memory access controller 12 is now configured. The DMA process is started in the ATAPI interface 17 by the device driver 92 writing to a control register of the ATAPI interface 17 using programmable IO (step s95). This causes the ATAPI interface 17 to request DMA.

The direct memory access controller 12 begins to read data from the ATAPI interface 17, as described above. The data in the FIFO 61 allocated to DMA channel 5 is output in bursts to UMA SDRAM 7 by the pixel bus interface 63 as described above.

Figure 17:
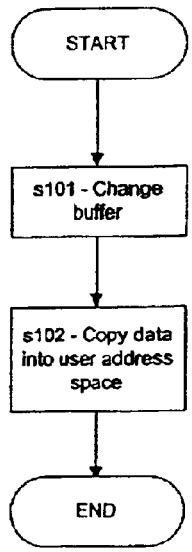

Referring to FIG. 17, on an interrupt generated by the TC flag being set, the buffer being used at the UMA SDRAM 7 must the changed (step s101) and the data in the full buffer copied into user address space (step s102).

Figure 18:
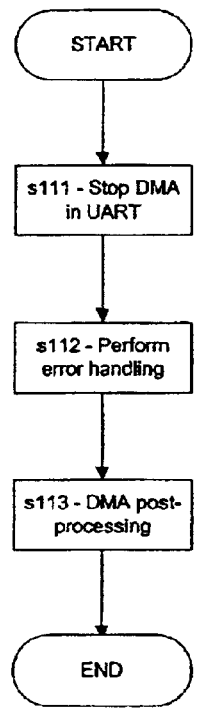

Referring to FIG. 18, on an interrupt, generated by the ATAPI interface 17 to mark the end of data transfer or a time out, an interrupt handler terminates the DMA process in the ATAPI interface 17 by writing the appropriate control data to it (step s111) and perform any error handling associated with the ATAPI interface 17 (step s112). The standard DMA post-processing routine (step s113) is then performed.

Scenario 5—Master Mode

The transfer of data by DMA to a UART on the register bus 21 from system RAM 3 in fixed length data transfer mode will now be described. The UART uses DMA request number 21, which is mapped onto DMA channel 3 in this example, for receiving data and the external bus is a PCI bus 9.

Figure 19:
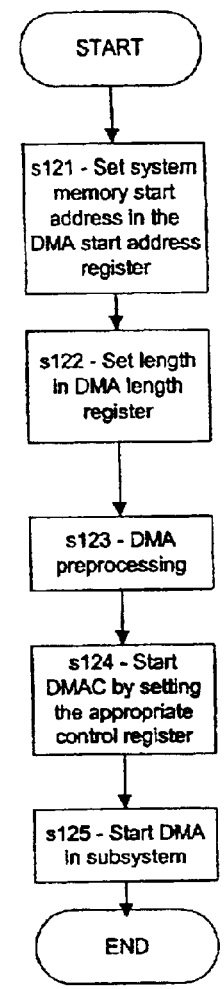
FIGS. 19 and 20 illustrate a fifth operational mode of the direct memory access controller of FIG. 4.

Referring to FIG. 19, the device driver 92 for the UART starts by writing the system RAM start address into the start address register for DMA channel 3 (step s121). Then the device driver 92 writes the byte count into the length register for DMA channel 3 (step s122). After the DMA channel has been set up, the device driver 92 calls the standard DMA pre-processing routine (step s123). The DMA transfer can now begin.

The device driver 52 writes a control value into the control register for DMA channel 3 (step s124). This control value comprises:

| | |
|---|---|
| CSEL | 10101 |
| ENDD | 0 |
| ENDS | 0 |
| PTEN | 1 |
| FBEN | 0 |
| FSEN | 0 |
| TCEN | 0 |
| DBEN | 0 |
| ML | 1 |
| RBEN | 0 |
| MM | 1 |
| DTRA | 1 |
| DR | 1 |
| RTRA | 1 |
| CWD | 01 |
| CWS | 00 |

The direct memory access controller 12 is now configured. The DMA process is started in the UART by the device driver 92 writing to a control register of the UART using programmable IO (step s125). This causes the UART to request DMA.

The direct memory access controller 12 now begins to read data from system RAM 3 in burst mode, in accordance with the secondary DMA address, and store it in the appropriate FIFO 61. The register bus interface 64 reads the data from the head of the appropriate FIFO 61 and sends it to the UART in accordance with the primary DMA address. Since, the UART's input register is only 16 bits wide, the 32 bits from the system RAM 3 must be sent to the UART in two write operations.

Figure 20:
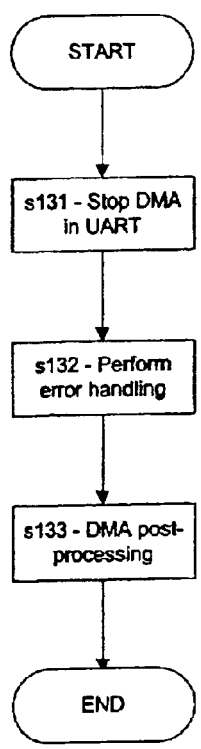

Referring to FIG. 20, on an interrupt, generated by the PT flag being set, the UART or a time out, the device driver 52 must terminate the DMA process in the UART by writing the appropriate control data to it (step s131) and perform any error handling associated with the UART (step s132). The standard DMA post-processing routine (step s133) is then performed.

Scenario 6—Master Mode

If a subsystem on the register bus has its own DMA counter and completion interrupt, in this example the ATAPI interface 17, continuous data transfer mode can be used. In this example, DMA channel 5 is used.

Figure 21:
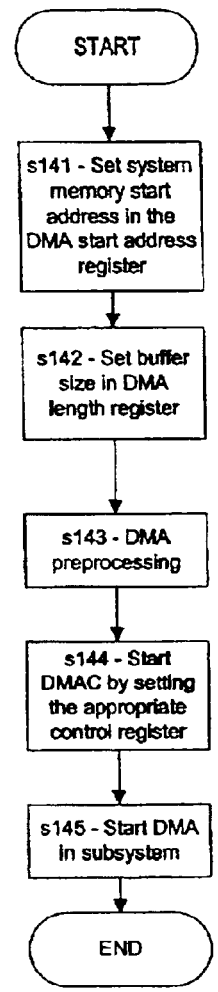
FIGS. 21, 22 and 23 illustrate a sixth operational mode of the direct memory access controller of FIG. 4.

Referring to FIG. 21, a transfer in this mode is initiated by the relevant device driver 92 writing the source start address into the start address register for DMA channel 5 (step s141). Then the device driver 92 writes the buffer size into the length register for appropriate DMA channel (step s142). After the DMA channel has been set up, the device driver 92 calls the standard DMA pre-processing routine (step s143). The DMA transfer can now begin.

The device driver 92 writes a control value into the control register for the DMA channel (step s144). This control value comprises:

| | |
|---|---|
| CSEL | 11100 |
| ENDD | 0 |
| ENDS | 0 |
| PTEN | 0 |
| FBEN | 0 |
| FSEN | 0 |
| TCEN | 1 |
| DBEN | 1 |
| ML | 1 |
| RBEN | 0 |
| MM | 1 |
| DTRA | 1 |
| DR | 1 |
| RTRA | 1 |
| CWD | 00 |
| CWS | 00 |

The direct memory access controller 12 is now configured. The DMA process is started in the ATAPI interface 17 by the device driver 92 writing to a control register of the subsystem using programmable IO (step s145). This causes the ATAPI interface 17 to request DMA.

The direct memory access controller 12 now begins to read data from system RAM 3 in burst mode and store it in the appropriate FIFO 61. The register bus interface 64 reads the data from the head of the appropriate FIFO 61 and sends it to the ATAPI interface 17 in accordance with the secondary DMA address derived from the stored DMA start address.

Figure 22:
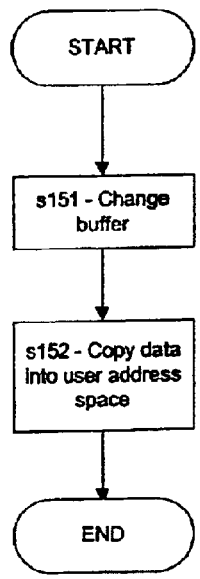

Referring to FIG. 22, on an interrupt generated by the TC flag being set, the buffer being used at the system RAM 3 must the changed (step s151) and the data copied into the empty buffer from user address space (step s152).

Figure 23:
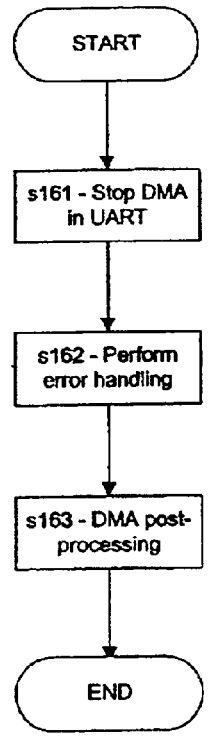

Referring to FIG. 23, on an interrupt, generated by the ATAPI interface 17 to mark the end of data transfer or a time out, the device driver 92 must terminate the DMA process in the ATAPI interface 17 by writing the appropriate control data to it (step s161) and perform any error handling associated with the ATAPI interface 17 (step s162). The standard DMA post-processing routine (step s63) is then performed.

Scenario 7—Master Mode

The transfer of data by DMA from the UMA SDRAM 7 to the aforementioned UART on the register bus 21 in fixed length data transfer mode will now be described. The UART uses DMA request number 21, which is mapped onto DMA channel 3 in this example, for receiving data.

Figure 24:
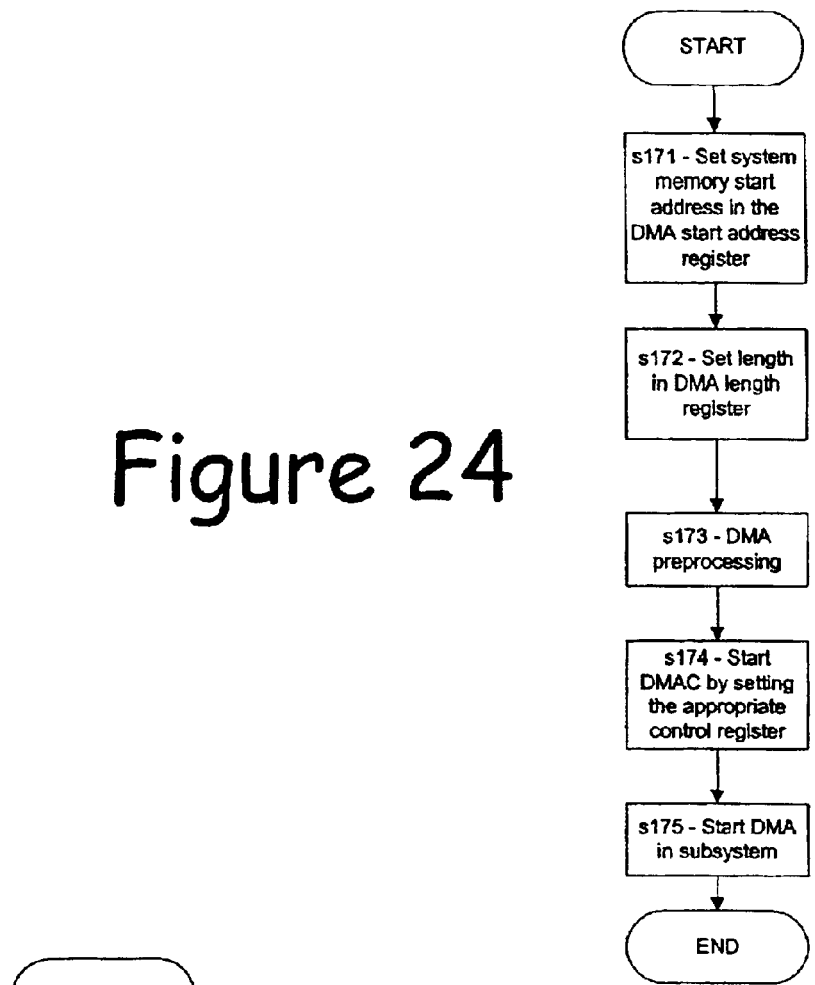
FIGS. 24 and 25 illustrate a seventh operational mode of the direct memory access controller of FIG. 4.

Referring to FIG. 24, the device driver 92 for the UART starts by writing the source start address into the start address register for DMA channel 3 (step s71). Then the device driver 92 writes the byte count into the length register for DMA channel 3 (step s172). After the DMA channel has been set up, the device driver 92 calls the standard DMA pre-processing routine (step s173). The DMA transfer can now begin.

The device driver 92 writes a control value into the control register for DMA channel 3 (step s174). This control value comprises:

| | |
|---|---|
| CSEL | 10101 |
| ENDD | 0 |
| ENDS | 0 |
| PTEN | 0 |
| FBEN | 0 |
| FSEN | 0 |
| TCEN | 0 |
| DBEN | 0 |
| ML | 0 |
| RBEN | 0 |
| MM | 1 |
| DTRA | 1 |
| DR | 1 |
| RTRA | 1 |
| CWD | 01 |
| CWS | 00 |

The direct memory access controller 12 is now configured. The DMA process is started in the UART by the device driver 92 writing to a control register of the UART using programmable IO (step s175). This causes the UART to request DMA.

The direct memory access controller 12 now begins to read data in bursts from UMA SDRAM 3 and store it in the appropriate FIFO 61. The register bus interface 64 of the direct memory access controller 12 outputs data at the head of the FIFO to the UART via the register bus 21.

Figure 25:
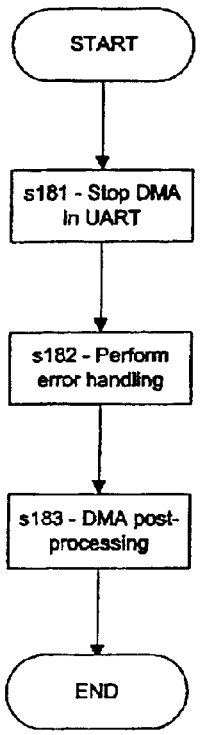

Referring to FIG. 25, on an interrupt, generated by the PT flag being set, the UART or a time out, the interrupt handler terminates the DMA process in the UART 18 by writing the appropriate control data to it (step s181) and performs any error handling associated with the UART 18 (step s182). The standard DMA post-processing routine (step s183) is then performed.

Scenario 8—Master Mode

If a subsystem on the register bus has its own DMA counter and completion interrupt, in this example the ATAPI interface 17, continuous data transfer mode can be used. DMA channel 5 is used in this example.

Referring to FIG. 26, a transfer in this mode is initiated by the relevant device driver 92 writing the source start address into the start address register for appropriate DMA channel (step s191). Then the device driver 92 writes the buffer size into the length register for the appropriate DMA channel (step s192). After the DMA channel has been set up, the device driver 92 calls the standard DMA pre-processing routine (step s193). The DMA transfer can now begin.

The device driver 92 writes a control value into the control register for the DMA channel (step s194). This control value comprises:

| | |
|---|---|
| CSEL | 11100 |
| ENDD | 0 |
| ENDS | 0 |
| PTEN | 0 |
| FBEN | 0 |
| FSEN | 0 |
| TCEN | 1 |
| DBEN | 1 |
| ML | 0 |
| RBEN | 0 |
| MM | 1 |
| DTRA | 1 |
| DR | 1 |
| RTRA | 1 |
| CWD | 00 |
| CWS | 00 |

The direct memory access controller 12 is now configured. The DMA process is started in the ATAPI interface 17 by the device driver 92 writing to a control register of the ATAPI interface 17 using programmable IO (step s195).

The direct memory access controller 12 now begins to read data from UMA SDRAM 3 and store it in the appropriate FIFO 61. The register bus interface 64 of the direct memory access controller 12 outputs data at the head of the FIFO 61 to the ATAPI interface 17 via the register bus 21.

Referring to FIG. 27, on an interrupt generated by the TC flag being set, the buffer being used at the UMA SDRAM 7 must the changed (step s201) and data copies to empty buffer from user address space (step s202).

Referring to FIG. 28, on an interrupt, generated by the ATAPI interface 17 to mark the end of data transfer or a time out, the interrupt handler terminates the DMA process in the ATAPI interface 17 by writing the appropriate control data to it (step s211) and performs any error handling associated with the subsystem (step s212). The standard DMA post-processing routine (step s213) is then performed.

Scenario 9—Slave Mode

The transfer of data by DMA from the aforementioned UART to system RAM 3 in fixed length data transfer mode, in the case where the direct memory access controller 12 is not the external bus master, will now be described.

Referring to FIG. 29, the device driver 92 for the UART writes the burst size and byte count into the length register for DMA channel 2 (step s221). After the DMA channel has been set up, the device driver 52 calls the standard DMA pre-processing routine (step s222). The DMA transfer can now begin.

The device driver 92 writes a control value into the control register for DMA channel 3 (step s223). This control value comprises:

| | |
|---|---|
| CSEL | 10100 |
| ENDD | 0 |
| ENDS | 0 |
| PTEN | 0 |

-continued

| | |
|---|---|
| FBEN | 1 |
| FSEN | 0 |
| TCEN | 0 |
| DBEN | 0 |
| ML | 0 |
| RBEN | 0 |
| MM | 0 |
| DTRA | 0 |
| DR | 0 |
| RTRA | 1 |
| CWD | 00 |
| CWS | 01 |

The direct memory access controller 12 is now configured. The DMA process is started in the UART by the device driver 92 writing to a control register of the UART using programmable IO (step s225).

The direct memory access controller 12 starts to read data from the UART into the appropriate FIFO 61.

Referring to FIG. 30, on generation of a FIFO burst interrupt, which indicates that a burst has been stored to FIFO from the UART, an interrupt handler updates the system RAM address held by the central processing unit 2 to the destination for the next burst (step s231). A burst of data is then read from the FIFO 61 directly by the central processing unit 2 and written to system RAM 3 (step s232). After a burst has been read, it is determined whether all the data due to be sent has been sent (step s233). If all of the data has not been sent, the interrupt handler returns. However, if all of the data has been transmitted, the DMA process in the UART is stopped (step s234), error handling for the UART is performed (step s235) and the standard DMA post-processing is carried out (step s236).

Scenario 10—Slave Mode

Continuous data transfer mode from a subsystem where the direct memory access controller 12 not the external bus master is performed generally in the same manner as fixed length data transfer mode. The control value set in the control register for DMA channel being used differs in that double buffer use is enabled and instead of a value being set in the DMA length register, the end of data transfer is determined by the subsystem transmitting the data.

Scenario 11—Slave Mode

The transfer of data by DMA to the aforementioned UART from system RAM 3 in fixed length data transfer mode, in the case where the direct memory access controller 12 is not external bus master, will now be described.

Figure 31:
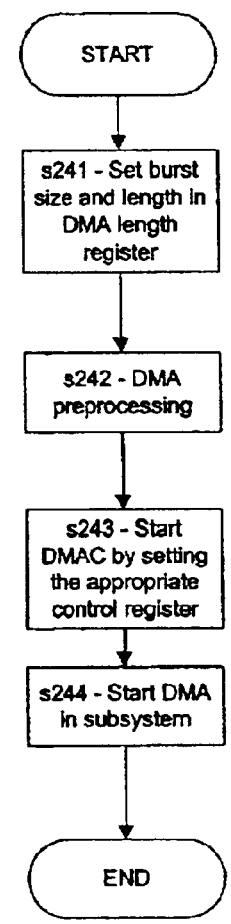
FIGS. 31 and 32 illustrate a eleventh and twelfth operational mode of the direct memory access controller of FIG. 4.

Referring to FIG. 31, the device driver 92 for the UART writes the burst size and byte count into the length register for DMA channel 2 (step s241). After the DMA channel has been set up, the device driver 52 calls the standard DMA pre-processing routine (step s242). The DMA transfer can now begin.

The device driver 92 writes a control value into the control register for DMA channel 3 (step s243). This control value comprises:

| | |
|---|---|
| CSEL | 10100 |
| ENDD | 0 |
| ENDS | 0 |
| PTEN | 0 |
| FBEN | 1 |
| FSEN | 0 |
| TCEN | 0 |
| DBEN | 0 |

-continued

| | |
|---|---|
| ML | 0 |
| RBEN | 0 |
| MM | 0 |
| DTRA | 0 |
| DR | 1 |
| RTRA | 1 |
| CWD | 00 |
| CWS | 01 |

The direct memory access controller 12 is now configured. The DMA process is started in the UART by the device driver 92 writing to a control register of the UART using programmable IO (step s245).

The central processing unit 2 writes bursts of data directly into the appropriate FIFO 61 and data in the FIFO 61 is written, in single transfers, to the UART by the register bus interface 63.

Figure 32:
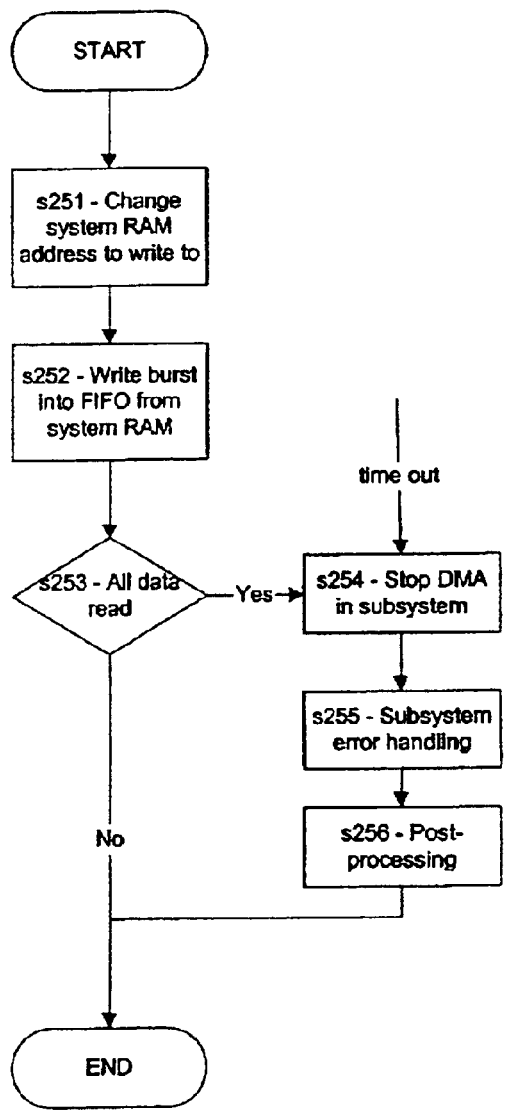

Referring to FIG. 32, on generation of a FIFO burst interrupt, which indicates that a burst has been stored in the FIFO, an interrupt handler updates the system RAM address to the source for the next burst (step s251). A new burst of data from the system RAM 3 can be written to the FIFO 61 by the central processing unit 2 when the FIFO 61 has been emptied by the register bus interface 64 (step s252). After a burst has been written to a FIFO, it is determined whether all the data due to be sent has been sent (step s253). If all of the data has not been sent, the interrupt handler returns. However, if all of the data has been transmitted, the DMA process in the UART is stopped (step s254), error handling for the UART is performed (step s255) and the standard DMA post-processing is carried out (step s236).

Scenario 12—Slave Mode

Continuous data transfer mode to a subsystem from system RAM 3 where the direct memory access controller 12 not the external bus master is performed generally in the same manner as fixed length data transfer mode. The control value set in the control register for DMA channel being used differs in that double buffer use is enabled and instead of a value being set in the DMA length register, the end of data transfer is determined by the subsystem transmitting the data.

The direct memory access controller 12 can also transfer data between subsystems on the register bus 12.

Scenario 13—Inter-subsystem Mode

A first method of transferring data by DMA to between two subsystems on the register bus 21, in fixed length data transfer mode will now be described.

Referring to FIG. 33, the device driver 92 for the transmitting subsystem starts by writing the destination address into the start address register for the appropriate DMA channel (step s261). Then the device driver 92 writes the byte count into the length register for the DMA channel (step s262). After the DMA channel has been set up, the device driver 92 calls the standard DMA pre-processing routine (step s263). The DMA transfer can now begin.

The device driver 52 writes a control value into the control register for DMA channel 3 (step s264). This control value comprises:

| | |
|---|---|
| CSEL | nnnnn |
| ENDD | 0 |
| ENDS | 0 |
| PTEN | 0/1 |
| FBEN | 0 |
| FSEN | 0 |
| TCEN | 0 |
| DBEN | 0 |
| ML | 0 |
| RBEN | 1 |
| MM | 0 |
| DTRA | 0 |
| DR | 0 |
| RTRA | 1 |
| CWD | nn |
| CWS | nn | where "n" represents a binary digit.

The direct memory access controller 12 is now configured. The DMA process is started in the transmitting subsystem by the device driver 92 writing to a control register of the transmitting subsystem using programmable IO (step s125). This causes the transmitting subsystem to request DMA The direct memory access controller 12 now begins to read data from the transmitting subsystem and store it in the appropriate FIFO 61. The register bus interface 64 reads the data from the head of that FIFO 61 and sends it to the receiving subsystem in accordance with the secondary DMA address derived from the stored DMA start address.

Referring to FIG. 34, on an interrupt, generated by the PT flag being set, the transmitting subsystem or a time out, an interrupt handler terminates the DMA process in the transmitting subsystem by writing the appropriate control data to it (step s271) and perform any error handling associated with the transmitting subsystem (step s272). The standard DMA post-processing routine (step s273) is then performed.

Scenario 14—Inter-subsystem Mode

A first method of transferring data by DMA to between two subsystems on the register bus 21, in continuous data transfer mode will now be described.

Referring again to FIG. 33, the device driver 92 for the transmitting subsystem starts by writing the system RAM start address into the start address register for the appropriate DMA channel (step s261). After the DMA channel has been set up, the device driver 92 calls the standard DMA pre-processing routine (step s262). The DMA transfer can now begin.

The device driver 52 writes a control value into the control register for DMA channel 3 (step s263). This control value comprises:

| | |
|---|---|
| CSEL | nnnnn |
| ENDD | 0 |
| ENDS | 0 |
| PTEN | 0 |
| FBEN | 0 |
| FSEN | 0 |
| TCEN | 0 |
| DBEN | 1 |
| ML | 0 |
| RBEN | 1 |
| MM | 0 |
| DTRA | 0 |
| DR | 0 |
| RTRA | 1 |
| CWD | nn |
| CWS | nn | where "n" is a binary digit.

The direct memory access controller 12 is now configured. The DMA process is started in the transmitting subsystem by the device driver 92 writing to a control register of the transmitting subsystem using programmable IO (step s264). This causes the transmitting subsystem to request DMA. After starting the DMA process in the transmitting subsystem.

The direct memory access controller 12 now begins to read data from the transmitting subsystem and store it in the appropriate FIFO 61. The register bus interface 64 reads the data from the head of the appropriate FIFO 61 and sends it to the receiving subsystem in accordance with the secondary DMA address derived from the stored DMA start address.

Referring again to FIG. 34, on an interrupt, generated by the transmitting subsystem or a time out, an interrupt handler terminates the DMA process in the transmitting subsystem by writing the appropriate control data to it (step s271) and perform any error handling associated with the transmitting subsystem (step s272). The standard DMA post-processing routine (step s273) is then performed.

Scenario 15—Inter-subsystem Mode

A second method of transferring data by DMA between two subsystems on the register bus 21, in fixed length data transfer mode will now be described.

Referring again to FIG. 33, the device driver 92 for the transmitting subsystem starts by writing the system RAM start address into the start address register for the appropriate DMA channel (step s261). Then the device driver 92 writes the byte count into the length register for the DMA channel (step s262). After the DMA channel has been set up, the device driver 92 calls the standard DMA pre-processing routine (step s263). The DMA transfer can now begin.

The device driver 52 writes a control value into the control register for the DMA channel (step s264). This control value comprises:

| CSEL | nnnnn |
|---|---|
| ENDD | 0 |
| ENDS | 0 |
| PTEN | 0/1 |
| FBEN | 0 |
| FSEN | 0 |
| TCEN | 0 |
| DBEN | 0 |
| ML | 0 |
| RBEN | 1 |
| MM | 0 |
| DTRA | 0 |
| DR | 1 |
| RTRA | 1 |
| CWD | nn |
| CWS | nn | where "n" is a binary digit.

The direct memory access controller 12 is now configured. The DMA process is started in the receiving subsystem by the device driver 92 writing to a control register of the receiving subsystem using programmable IO (step s265). This causes the receiving subsystem to request DMA.

The direct memory access controller 12 now begins to read data from the transmitting subsystem and store it in the appropriate FIFO 61. The register bus interface 64 reads the data from the head of the appropriate FIFO 61 and sends it to the receiving subsystem in accordance with the primary DMA address.

Referring again to FIG. 34, on an interrupt, generated by the PT flag being set, the receiving subsystem or a time out, an interrupt handler terminates the DMA process in the receiving subsystem by writing the appropriate control data to it (step s271) and performs any error handling associated with the transmitting subsystem (step s272).

Scenario 16—Inter-subsystem Mode

A second method of transferring data by DMA to between two subsystems on the register bus 21, in continuous data transfer mode will now be described.

Referring again to FIG. 33, the device driver 92 for the transmitting subsystem starts by writing the system RAM start address into the start address register for the appropriate DMA channel (step s261). After the DMA channel has been set up, the device driver 92 calls the standard DMA pre-processing routine (step s262). The DMA transfer can now begin.

The device driver 52 writes a control value into the control register for DMA channel 3 (step s263). This control value comprises:

| CSEL | nnnnn |
|---|---|
| ENDD | 0 |
| ENDS | 0 |
| PTEN | 0 |
| FBEN | 0 |
| FSEN | 0 |
| TCEN | 0 |
| DBEN | 1 |
| ML | 0 |
| RBEN | 1 |
| MM | 0 |
| DTRA | 0 |
| DR | 1 |
| RTRA | 1 |
| CWD | nn |
| CWS | nn | where "n" is a binary digit.

The direct memory access controller 12 is now configured. The DMA process is started in the receiving subsystem by the device driver 92 writing to a control register of the receiving subsystem using programmable IO (step s264). This causes the receiving subsystem to request DMA. After starting the DMA process in the receiving subsystem.

The direct memory access controller 12 now begins to read data from the transmitting subsystem and store it in the appropriate FIFO 61. The register bus interface 64 reads the data from the head of the appropriate FIFO 61 and sends it to the receiving subsystem in accordance with the primary DMA address.

Referring again to FIG. 34, on an interrupt, generated by the transmitting subsystem or a time out, an interrupt handler terminates the DMA process in the receiving subsystem by writing the appropriate control data to it (step s271) and perform any error handling associated with the receiving subsystem (step s272). The standard DMA post-processing routine (step s273) is then performed.

Scenario 17—External Mode

A transfer by DMA from a UART on the register bus to the system RAM 3 under the control of the central processing unit's direct memory access controller will now be described. The UART uses DMA request number 20 which is mapped onto DMA channel 2 in this example.

Figure 35:
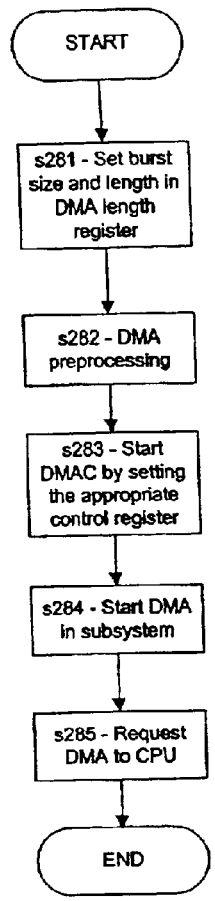
FIGS. 35 and 36 illustrate a seventeenth operational mode of the direct memory access controller of FIG. 4.

Referring to FIG. 35, the device driver for the UART starts by writing the burst size and transfer length in bytes to the DMA length register of DMA channel 2 (step s281). The standard DMA preprocessing is then performed (step s282) and the DMA operation is started in the UART by setting the appropriate DMA control register (step s283). The value set in the control register comprises:

| | |
|---|---|
| CSEL | 10100 |
| ENDD | 0 |
| ENDS | 0 |
| PTEN | 0 |
| FBEN | 0 |
| FSEN | 0 |
| TCEN | 0 |
| DBEN | 0 |
| ML | 0 |
| RBEN | 0 |
| MM | 0 |
| DTRA | 0 |
| DR | 0 |
| RTRA | 1 |
| CWD | 00 |
| CWS | 01 |

The DMA channel number 2 is written to the EDMS field of the DMA external select register and the EDMA bit is set to 1 and the DMA controller in the central processing unit 2 is set up. The direct memory access controller 12 and the central processing unit's DMA controller are now configured. The DMA process is started in the UART by the device driver writing to its control register using programmable IO. This causes the UART to request DMA by signalling on DMA request line number 20. The direct memory access controller 12 then begins to read data, 2 bytes at a time, from the UART and write it into the appropriate FIFO 61.

The data in the allocated FIFO 61 is then read by the central processing unit's DMA controller. This process is controlled by signals generated by the system interface 62 as described above.

Figure 36:
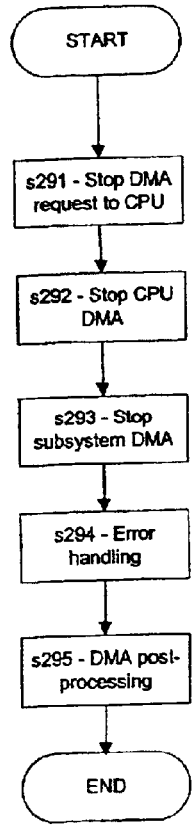

Referring to FIG. 36, the DMA is terminated on receipt of an interrupt for the central processing unit 2 or a time out interrupt. On receipt of one of these interrupts, a stop DMA request is sent to the central processing unit 2 and the external DMA flag in the DMA control register is reset (step s291). The central processing unit's DMA operation is then stopped (step s292) and the DMA operation in the subsystem is stopped (step s293). Error handling is the performed (step s294) followed by the DMA post-processing (step s295).

Scenario 18—External Mode

A transfer from system RAM 3 to the ATAPI interface under the control of the central processing unit's direct memory access controller will now be described. This example uses DMA channel 5.

Figure 37:
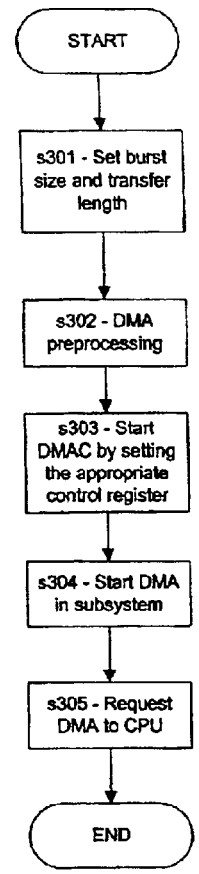
FIGS. 37 and 38 illustrate a eighteenth operational mode of the direct memory access controller of FIG. 4.

Referring to FIG. 37, the device driver for the ATAPI interface 17 starts by writing the burst size and transfer length in bytes to the DMA length register of DMA channel 5 (step s301). The standard DMA preprocessing is then performed (step s302) and the DMA operation is started in the ATAPI interface 17 by setting the appropriate DMA control register (step s303). The value set in the control register comprises:

| | |
|---|---|
| CSEL | 11100 |
| ENDD | 0 |
| ENDS | 0 |
| PTEN | 0 |
| FBEN | 0 |
| FSEN | 0 |
| TCEN | 0 |
| DBEN | 0 |
| ML | 0 |
| RBEN | 0 |
| MM | 0 |

-continued

| | |
|---|---|
| DTRA | 0 |
| DR | 1 |
| RTRA | 1 |
| CWD | 00 |
| CWS | 00 |

The DMA channel number 5 is written to the EDMS field of the DMA external select register and the EDMA bit is set to 1 and the DMA controller in the central processing unit 2 is set up. The direct memory access controller 12 and the central processing unit's DMA controller are now configured. The DMA process is started in the ATAPI interface 17 by the device driver writing to its control register using programmble IO. This causes the ATAPI to request DMA by signalling on DMA request line number 28. The direct memory access controller 12 then requests DMA from the central processing unit's DMA controller. The central processing unit's DMA controller responds by sending a burst of data to the direct memory access controller 12, which stores it in the FIFO for DMA channel 0. The register bus interface 63 reads the data out of the FIFO 61 a word at a time and sends it to the ATAPI interface 17. When there is sufficient space in the FIFO 61 for a burst, a further DMA request is sent to the central processing unit's DMA controller.

Figure 38:
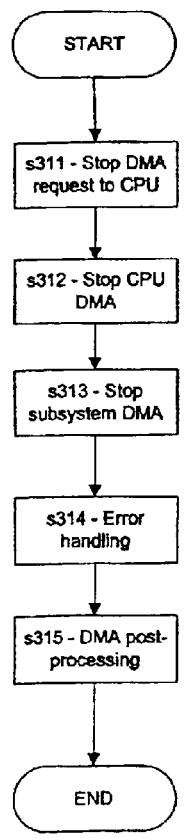

Referring to FIG. 38, the DMA is terminated on receipt of an interrupt for the central processing unit 2 or a time out interrupt. On receipt of one of these interrupts, a stop DMA request is sent to the central processing unit 2 and the external DMA flag in the DMA control register is reset (step s311). The central processing unit's DMA operation is then stopped (step s312) and the DMA operation in the subsystem is stopped (step s313). Error handling is the performed (step s314) followed by the DMA post-processing (step s315).

Figure 39:
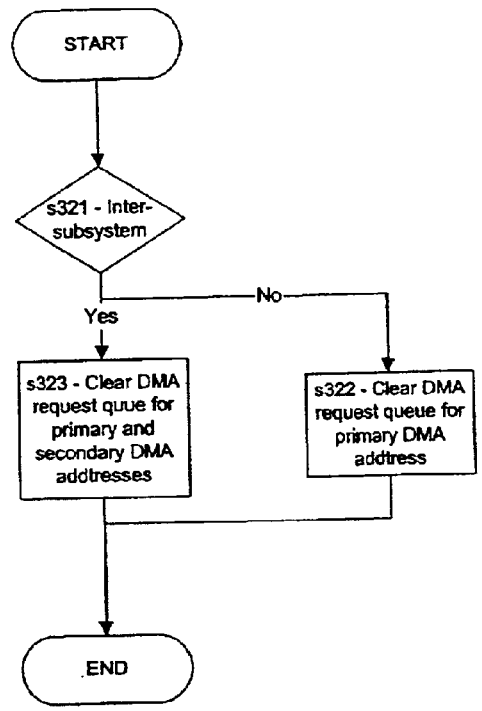
FIG. 39 is a flowchart illustrating a DMA preprocessing routine.

Referring to FIG. 39, the aforementioned preprocessing comprises determining whether the transfer is an inter-subsystem transfer (step s321) and, if not, clearing the request queue in the direct memory access controller 12 for the primary DMA address (step s322) by setting the DMA subsystem request status register RS flag for the primary DMA address to 1 and all other RS flags to 0. If the transfer is an inter-subsystem transfer (step s321), the DMA request queue in the direct memory access controller 12 for both the primary and secondary DMA addresses are cleared (step s323) by setting the DMA subsystem request status register RS flags for the primary and secondary DMA addresses to 1 and all other RS flags to 0.

Figure 40:
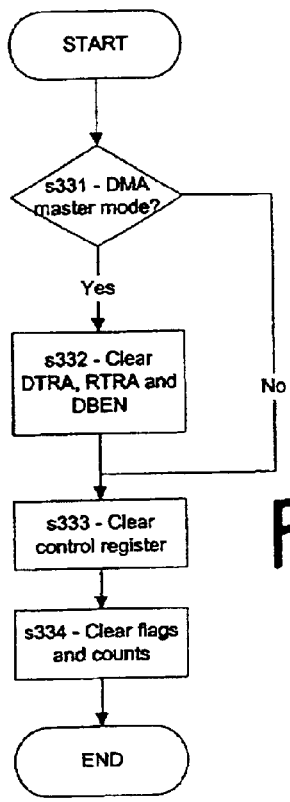
FIG. 40 is a flowchart illustrating a DMA post-processing routine.

Referring to FIG. 40, the aforementioned post-processing comprises determining whether the direct memory access controller 12 is operating as bus master for the pixel bus 20 or the external bus 8, 9 (step s331). If so, the DTRA, RTRA and DBEN flags are cleared (step s332) before the DMA channel is stopped by clearing the corresponding control register (step s333) otherwise the control register is cleared directly after step s331. Finally, the other flags and counts associated with the DMA channel are cleared and the FIFO 61 flushed.

It will be appreciated that the embodiments described above may be modified in may ways. For instance, the number and nature of the subsystems on the register and pixel buses may be changed. Also, other bus protocols may be employed.

What is claimed is:

1. A computer system component comprising a burst mode data transfer proxy for bridging a bus operable in burst transfer mode and a single transfer mode bus, wherein the burst mode data transfer proxy comprises:

remotely programmable control register means;

a plurality of buffers for buffering data transfers between a burst mode bus and a single transfer mode bus;

a first burst mode bus interface operable in dependence on control data in said register means for interfacing the said buffers to a first burst mode bus; and a single transfer mode bus interface operable in dependence on control data in said register means for interfacing said buffers to a single transfer mode bus.

2. A computer system component according to claim 1, including a second burst mode bus interface operable in dependence on control data in said register means for interfacing the said buffers to a second burst mode bus.

3. A computer system component according to claim 1, wherein the buffers comprise a plurality of FIFOs.

4. A computer system component according to claim 3, wherein the single transfer mode bus interface is configured for reading data from a head of a FIFO and writing the data to a remote address, identified by a FIFO to address mapping provided by said control registers, via a single transfer mode bus.

5. A computer system component according to claim 3, including direct memory access control means responsive to direct memory access request signals, wherein the single transfer mode bus interface is operable in a response to a direct memory access request signal received by the direct memory access means to transfer data from a remote address to one of said FIFOs via a single transfer mode bus.

6. A computer system component according to claim 5, wherein the control registers are programmable such that the FIFO is selected in dependence on the source of the direct memory access request signal.

7. A computer system component according to claim 3, including direct memory access control means responsive to direct memory access request signals, wherein the single transfer mode bus interface is operable in a response to a direct memory access request signal received by the direct memory access controls means to transfer data to a remote address from one of said FIFOs via a single transfer mode bus.

8. A computer system component according to claim 7, wherein the control registers are programmable such that the FIFO is selected in dependence on the source of the direct memory access request signal.

9. A computer system component according to claim 3, wherein the first burst mode bus interface and the single transfer mode bus interface are configured to bypass the FIFOs for single transfer mode transfers between the burst mode bus connected to the burst mode bus interface and a single transfer mode bus connected to the single transfer mode bus interface.

10. A computer system component according to claim 9, wherein burst mode bus interface discriminates said single transfer mode transfers from burst mode transfers by means of the associated address signals.

11. A computer system component according to claim 9, wherein the single transfer mode interface is configured to limit access to a single mode transfer bus connected thereto for single transfer mode transfers from a burst mode bus connected to the first burst mode bus interface.

12. A computer system component according to claim 11, wherein the single transfer mode interface increments a counter by a value in a predetermined one of said control registers for each cycle of a clock during which a single transfer mode transfer is taking place, bypassing the FIFOs and preventing access to said single transfer mode bus when the count reaches a threshold defined in a predetermined one of said control registers, the count being decremented by one for each cycle of said clock when no such single transfer mode transfer is taking place.

13. A computer system component according to claim 3, including direct memory access control means responsive to direct memory access request signals, wherein:

the single transfer mode bus interface is operable in a response to a direct memory access request signal received by the direct memory access means to transfer data to a remote address from one of said FIFOs via a single transfer mode bus;

the single transfer mode bus interface is operable in a response to a direct memory access request signal received by the direct memory access means to transfer data from a remote address to one of said FIFOs via a single transfer mode bus; and the first burst mode bus interface and the single transfer mode bus interface are configured to bypass by FIFOs for single transfer mode transfers between a burst mode bus connected to the burst mode bus interface and a single transfer mode bus connected to the single transfer mode bus interface.

14. A computer system component according to claim 13, wherein the control registers are programmable such that the FIFO is selected in dependence on the source of the direct memory access request signal.

15. A computer system component according to claim 13, wherein the control registers are programmable such that the FIFO is selected in dependence on the source of the direct memory access request signal.

16. A computer system component according to claim 15, wherein the burst mode bus interface discriminates said single transfer mode transfers from burst mode transfers by means of the associated address signals.

17. A computer system component according to claim 15, wherein the single transfer mode interface is configured to limit access to a single mode transfer bus connected thereto for single transfer mode transfers from a burst mode bus connected to the first burst mode bus interface.

18. A computer system component according to claim 17, wherein the single transfer mode interface increments a counter by a value in a predetermined one of said control registers for each cycle of a clock during which a single transfer mode transfer is taking place, bypassing the FIFOs and preventing access to said single transfer mode bus when the count reaches a threshold defined in a predetermined one of said control registers, the count being decremented by one for each cycle of said clock when no such single transfer mode transfer is taking place.

19. A computer system component according to claim 1, wherein the buffers are implemented by means of cells of a random access memory.

20. A computer system component according to claim 19, wherein the random access memory is a dual port random access memory, the first burst mode bus interface and the single transfer mode interface share one port of the random access memory and the second burst mode bus interface uses another port of the random access memory.

21. A computer system component according to claim 19, wherein the locations and sizes of said FIFOs in the random access memory are defined by data in said control register means.

22. A computer system component according to claim 19, wherein the first burst mode bus interface is configurable, by means of said control registers means, to allow a remote device to write a burst of data directly to cells forming one of said buffers.

23. A computer system component according to claim 19, wherein the first burst mode bus interface is configurable, by means of said control registers means, to allow a remote device to read a burst of data directly from cells forming one of said buffers.

24. A computer system component according to claim 19, wherein the burst mode bus interfaces are configurable, by means of said control registers means, to read a burst of data from one of said buffers and write the burst of data to a remote address via a burst mode bus, the remote address and the buffer being determined by data in said control register means.

25. A computer system component according to claim 19, wherein the burst mode bus interfaces are configurable, by means of said control registers means, to read a burst of data from a remote address via a burst mode bus and write the burst of data to one of said buffers, the remote address and the buffer being determined by data in said control register means.

26. A computer system component according to claim 1, including a second burst mode bus interface operable in dependence on control data in said register means for interfacing said buffers to a second burst mode bus, wherein the buffers comprise a plurality of FIFOs implemented by means of cells of random access memory.

27. A computer system component according to claim 26, wherein:

the random access memory is dual port random access memory, the first burst mode bus interface and the single transfer mode interface sharing one port of the random access memory and the second burst mode bus interface using another port of the random access memory;

locations and sizes of said FIFOs in the random access memory are defined by data in said control register means, the first burst mode bus interface is configurable, by means of said control registers means, to allow a remote device to write a burst of data directly to cells forming one of said buffers;

the first burst mode bus interface is configurable, by means of said control registers means, to allow a remote device to read a burst of data directly from cells forming one of said buffers; and the burst mode bus interfaces are configurable, by means of said control registers means, to read a burst of data from one of said buffers and write the burst of data to a remote address via a burst mode bus, the remote address and the buffer being determined by data in said control register means.

28. A peripheral circuit for use in a computer apparatus, the circuit comprising:

a computer system component comprising:

remotely programmable control register means;

a plurality of buffers for buffering data transfer between a burst mode bus and a single transfer mode bus;

a first burst mode bus interface operable in dependence on control data in said register means for interfacing the said buffers to a first burst mode bus;

a second burst mode bus interface operable in dependence on control data in said register means for interfacing the said buffers to a second burst mode bus;

a single transfer mode bus interface operable in dependence on control data in said register means for interfacing said buffers to a single transfer mode bus;

a first burst mode bus connected to the second burst mode bus interface of the computer system component;

a single transfer mode bus connected to the single transfer mode bus interface of the computer system components; and an interface circuit for interfacing said peripheral circuit to a second burst mode bus; and wherein the interface circuit connects the first burst mode bus or the first burst mode bus interface of the computer system component to said second burst mode bus in dependence on an address associated with a data transfer via the interface circuit.

29. A peripheral circuit according to claim 28, including an SDRAM accessible via the first burst mode bus.

30. A peripheral circuit according to claim 28, including a subsystem having direct access to the first burst mode bus for the transfer of signal data and direct access to the single transfer mode bus for the transfer of control data.

31. A peripheral circuit according to claim 28, including a subsystem having direct access to the single transfer mode bus for the transfer of both signal data and control data.

32. A peripheral circuit according to claim 28, including an SDRAM accessible via the first burst mode bus, a subsystem having direct access to the first burst mode bus for the transfer of signal data and direct access to the single transfer mode bus for the transfer of control data and a subsystem having direct access to the single transfer mode bus for the transfer of both signal data and control data.

33. A computer system including a central processing unit, a burst mode bus accessible to the central processing unit and a peripheral circuit comprising:

a computer system component comprising:

remotely programmable control register means;

a plurality of buffers for buffering data transfer between a burst mode bus and a single transfer mode bus;

a first burst mode bus interface operable in dependence on control data in said register means for interfacing the said buffers to a first burst mode bus;

a second burst mode bus interface operable in dependence on control data in said register means for interfacing said buffers to a second burst mode bus;

a single transfer mode bus interface operable in dependence on control data in said register means for interfacing said buffers to a single transfer mode bus;

a first burst mode bus connected to the second burst mode bus interface of the computer system component;

a single transfer mode bus connected to the single transfer mode bus interface of the computer system component;

an interface circuit for interfacing said peripheral circuit to a second burst mode bus; and wherein the interface circuit connects the first burst mode bus or the first burst mode bus interface of the computer system component to said second burst mode bus in dependence on an address associated with a data transfer via the interface circuit; and said interface circuit interfaces said burst mode bus accessible to the central processing unit to said first burst mode bus and said computer system component.

* * * * *